United States Patent
Hiroe et al.

(10) Patent No.: US 10,751,925 B2
(45) Date of Patent: Aug. 25, 2020

(54) WEATHER STRIP AND METHOD FOR MANUFACTURING SAME

(71) Applicants: Keiji Hiroe, Obu (JP); Kotaro Oka, Obu (JP)

(72) Inventors: Keiji Hiroe, Obu (JP); Kotaro Oka, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 90 days.

(21) Appl. No.: 16/088,256

(22) PCT Filed: Sep. 1, 2016

(86) PCT No.: PCT/JP2016/075647
§ 371 (c)(1),
(2) Date: Sep. 25, 2018

(87) PCT Pub. No.: WO2017/168782
PCT Pub. Date: Oct. 5, 2017

(65) Prior Publication Data
US 2019/0084209 A1 Mar. 21, 2019

(30) Foreign Application Priority Data
Mar. 28, 2016 (JP) .................................. 2016-063075

(51) Int. Cl.
*E06B 7/22* (2006.01)
*B29C 48/30* (2019.01)
(Continued)

(52) U.S. Cl.
CPC .............. *B29C 48/30* (2019.02); *B29C 48/12* (2019.02); *B29C 48/21* (2019.02); *B29C 48/495* (2019.02);
(Continued)

(58) Field of Classification Search
CPC ....... B29C 48/30; B29C 48/495; B29C 48/03; B29C 48/16; B29C 48/92; B29C 48/12;
(Continued)

(56) References Cited

U.S. PATENT DOCUMENTS

| 4,848,035 A | * | 7/1989 | Sakuma | ................... B60J 10/24 49/490.1 |
| 2008/0000165 A1 | * | 1/2008 | Ochiai | ..................... B60J 10/24 49/490.1 |

(Continued)

FOREIGN PATENT DOCUMENTS

| JP | S63-132022 A | 6/1988 |
| JP | H03-1857 U1 | 1/1991 |

(Continued)

OTHER PUBLICATIONS

Oct. 4, 2016 International Search Report issued in International Patent Application No. PCT/JP2016/075647.

(Continued)

*Primary Examiner* — Jerry E Redman
(74) *Attorney, Agent, or Firm* — Oliff PLC

(57) ABSTRACT

An extrusion die includes a die and a core, and the core includes a movable core portion that is movable along an extrusion direction and a fixed core portion. The movable core portion has non-similar cross-sectional shapes at front and rear two positions along the extrusion direction. A first portion of the elongated weather strip is molded in a state where the movable core portion is disposed at an advance position, and a second portion of the elongated weather strip is molded in a state where the movable core portion is disposed at a retreat position. During the molding of the second portion, a supply amount per unit time of a material for the sealing portion to a molding space for the hollow sealing portion that is secured between the core and the die (Continued)

is set to be larger than that during the molding of the first portion.

5 Claims, 18 Drawing Sheets

(51) Int. Cl.
  B60J 10/24    (2016.01)
  B60J 10/84    (2016.01)
  B29C 48/92    (2019.01)
  B60J 10/16    (2016.01)
  B29C 48/495   (2019.01)
  B60J 10/21    (2016.01)
  B60J 10/27    (2016.01)
  B29C 48/21    (2019.01)
  B29C 48/12    (2019.01)
  B29K 23/00    (2006.01)
  B29K 105/24   (2006.01)
  B29L 31/30    (2006.01)

(52) U.S. Cl.
  CPC ............... *B29C 48/92* (2019.02); *B60J 10/16* (2016.02); *B60J 10/21* (2016.02); *B60J 10/24* (2016.02); *B60J 10/27* (2016.02); *B60J 10/84* (2016.02); *B29K 2023/16* (2013.01); *B29K 2105/24* (2013.01); *B29L 2031/3005* (2013.01)

(58) Field of Classification Search
  CPC ... B60J 10/27; B60J 10/21; B60J 10/84; B60J 10/24; B60J 10/22
  USPC ..................... 49/498.1, 479.1, 506
  See application file for complete search history.

(56) References Cited

U.S. PATENT DOCUMENTS

| | | | |
|---|---|---|---|
| 2012/0240473 A1* | 9/2012 | Minoura | B60J 10/24 49/489.1 |
| 2014/0311040 A1* | 10/2014 | One | B60J 10/30 49/490.1 |
| 2017/0001502 A1* | 1/2017 | Daio | B60J 10/25 |
| 2017/0015184 A1* | 1/2017 | Sawada | B60J 10/90 |
| 2017/0225554 A1* | 8/2017 | Matsuwaki | B60J 10/15 |
| 2018/0370343 A1* | 12/2018 | Hiroe | B29C 48/15 |
| 2019/0031007 A1* | 1/2019 | Kamiya | B60J 10/24 |
| 2019/0084209 A1* | 3/2019 | Hiroe | B29C 48/495 |
| 2019/0263238 A1* | 8/2019 | Hiroe | B60J 10/16 |

FOREIGN PATENT DOCUMENTS

| | | |
|---|---|---|
| JP | H05-031784 A | 2/1993 |
| JP | H11-179782 A | 7/1999 |
| JP | 2007-290586 A | 11/2007 |

OTHER PUBLICATIONS

Oct. 4, 2016 Written Opinion issued in International Patent Application No. PCT/JP2016/075647.

Jun. 18, 2019 Office Action issued in Japanese Application No. 2016-063075.

* cited by examiner

FIG.1
(A)
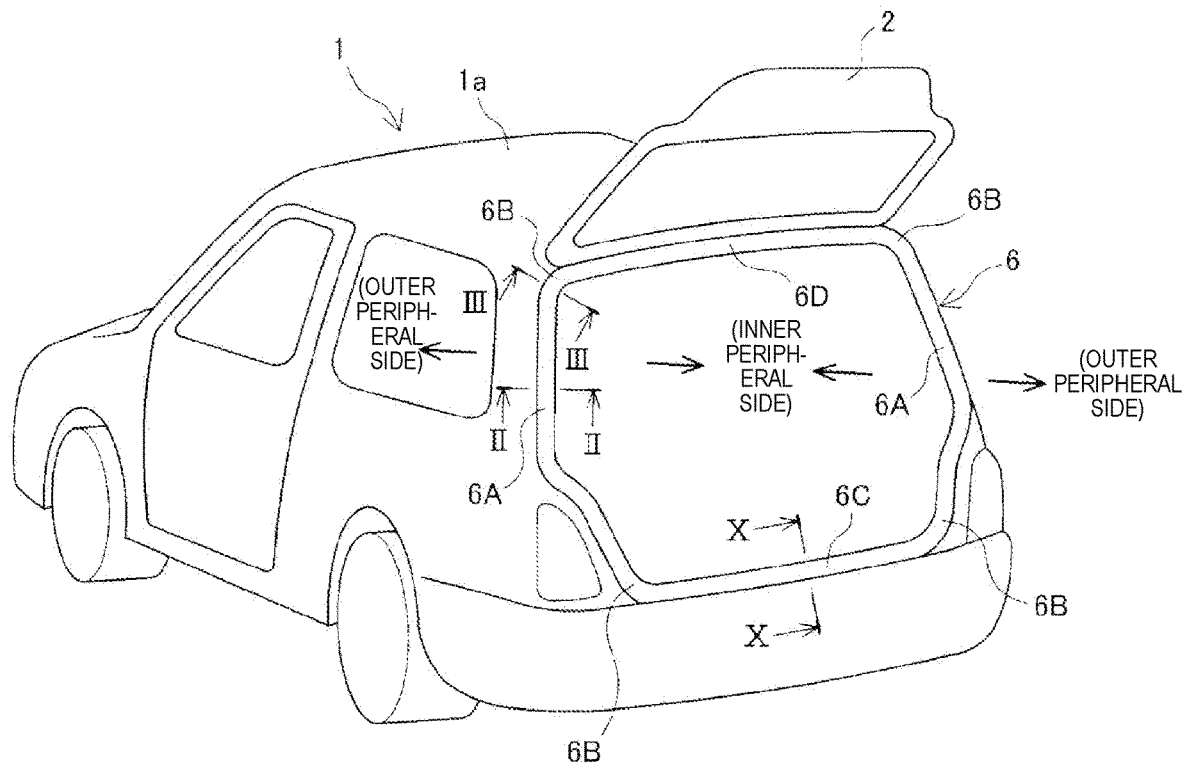
(B)
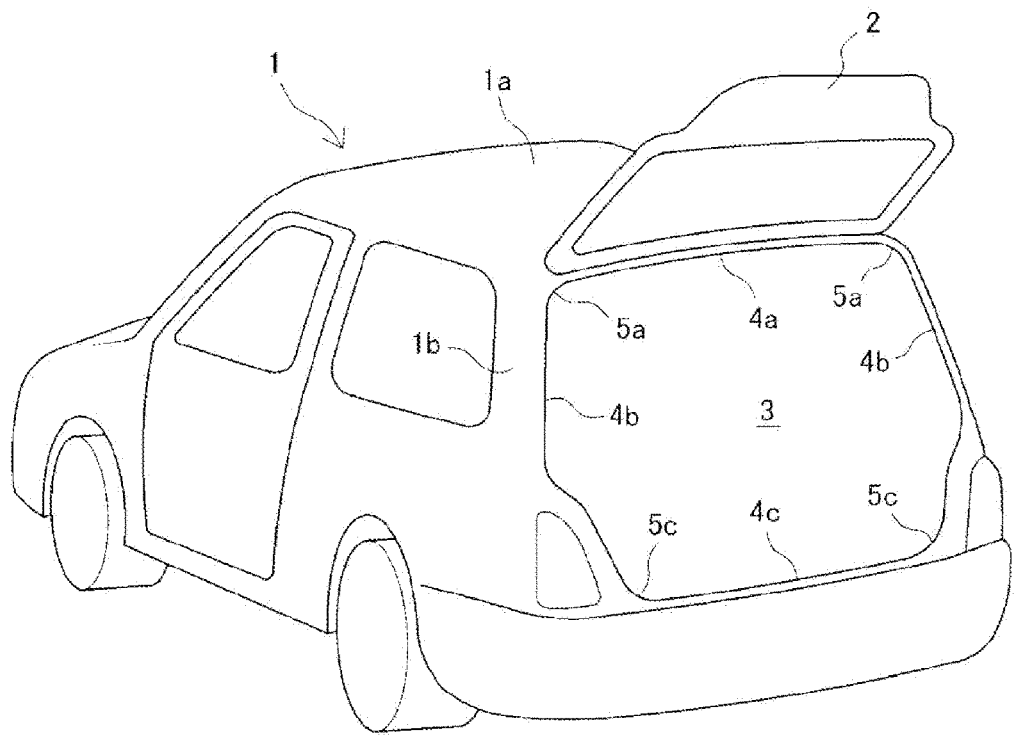

FIG.11
(A)
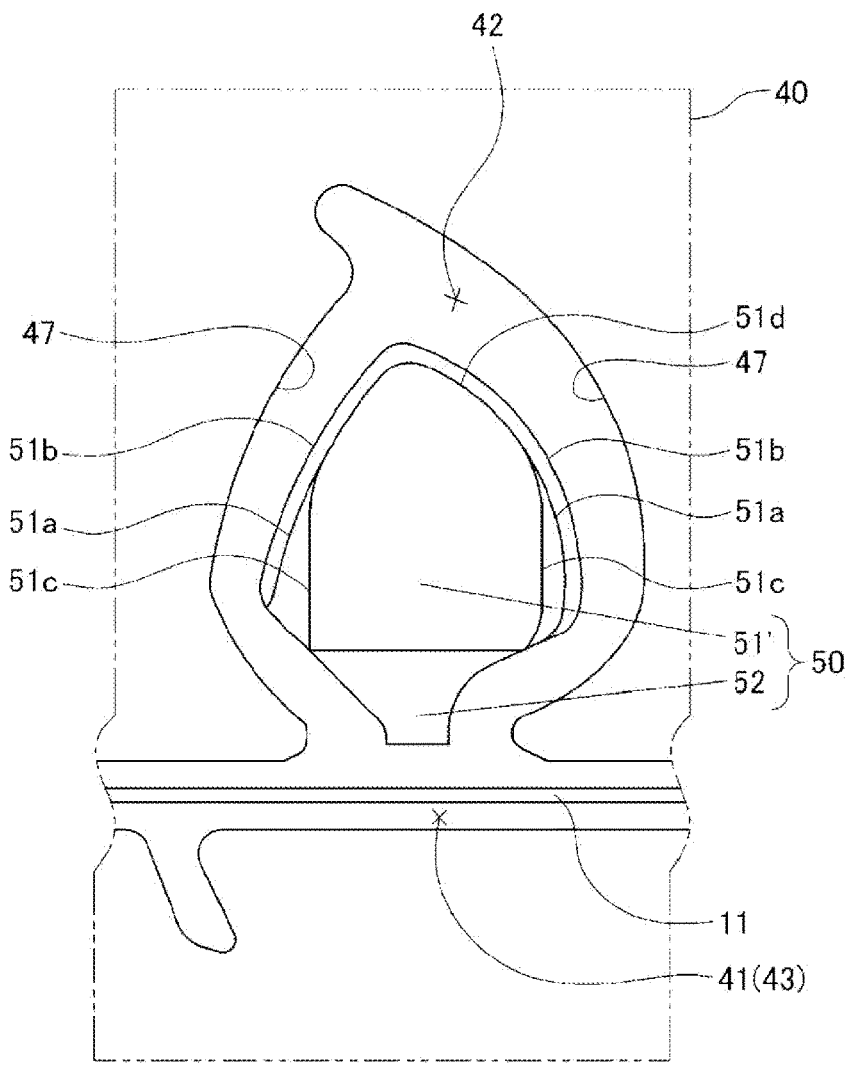
(B)
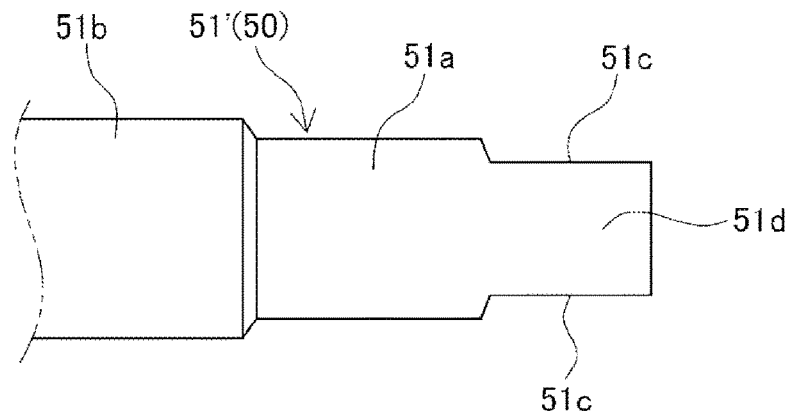

FIG.13
(A)
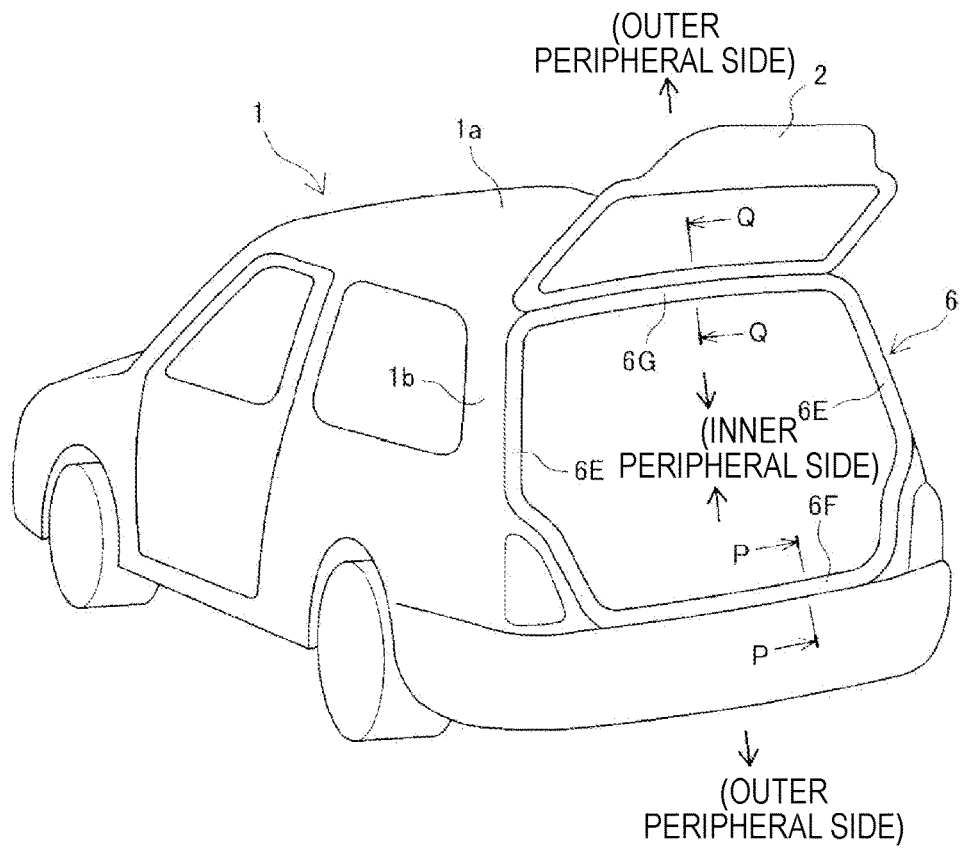
(B)
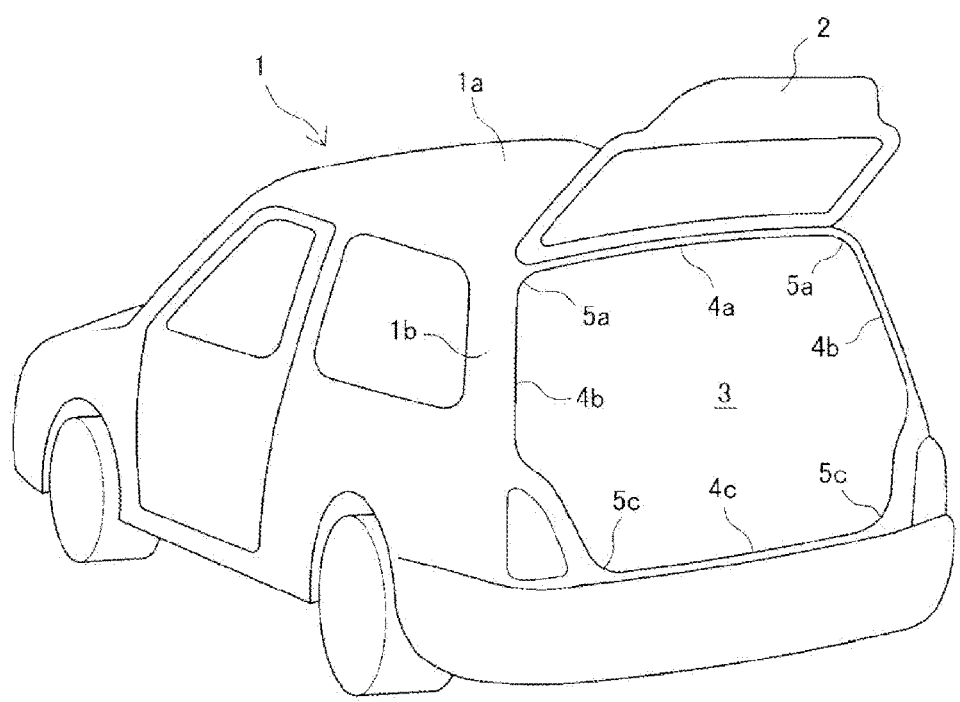

FIG.18
(A)
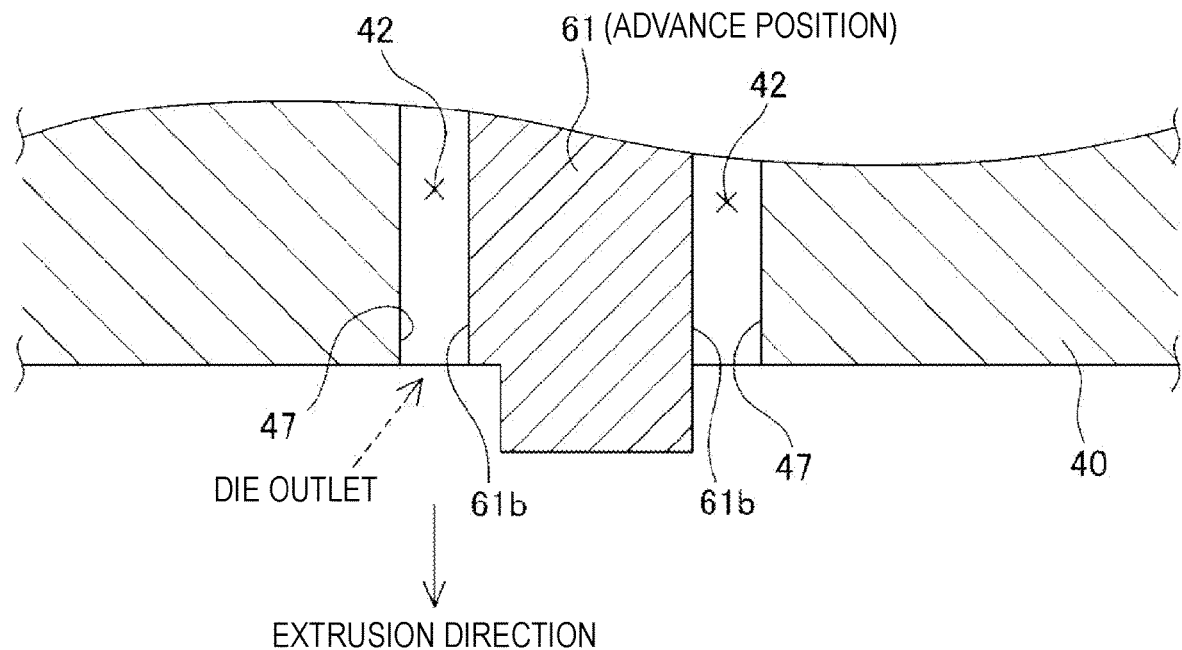
EXTRUSION DIRECTION
(B)
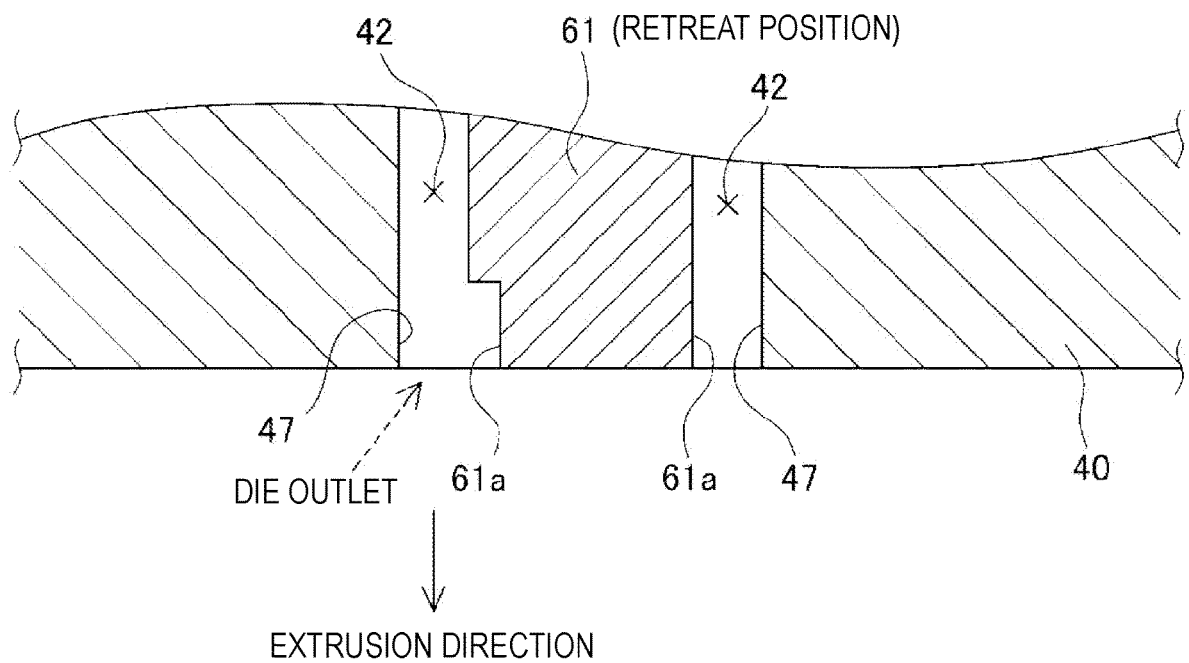
EXTRUSION DIRECTION

WEATHER STRIP AND METHOD FOR MANUFACTURING SAME

TECHNICAL FIELD

The present invention relates to a method for manufacturing a weather strip and particularly relates to an extrusion method for a weather strip using a special extrusion die. In addition, the invention relates to a weather strip including a hollow sealing portion.

BACKGROUND ART

Generally, in a vehicle, a weather strip for sealing a gap to prevent entrance of wind and rain or dust thereinto is provided, the gap being provided between a peripheral portion of a vehicle body opening portion (for example, a back door opening portion, a trunk opening portion, a front door opening portion, or a rear door opening portion) and a peripheral portion of a door body (for example, a back door, a trunk lid, a front door, or a rear door) that can open and close the vehicle body opening portion. The peripheral portion of the vehicle body opening portion is bordered with a combination of a side portion that extends substantially linearly and a corner portion that is bent to connect the side portion to another side portion. In many cases, the weather strip has a length corresponding to the peripheral portion of the vehicle body opening portion and is mounted along the opening edge. Therefore, it is necessary to attach the weather strip to the corner portion while bending the weather strip. However, in a case where the weather strip is bent to correspond to the corner portion, the hollow sealing portion of the weather strip unnaturally gets crushed, which may cause partial deterioration in sealing performance. In order to prevent the unnatural crushing of the hollow sealing portion, a design in which a wall thickness of a portion of the hollow sealing portion to be mounted on the corner portion is larger than a wall thickness of a portion of the hollow sealing portion to be mounted on the side portion may be adopted.

Patent Reference 1 (JP-A-S63-132022) discloses a weather strip for a vehicle in which the above-described design concept is embodied, and a method and a device for manufacturing the same. That is, in a weather strip according to an embodiment of Patent Reference 1, a sealing portion 13 of a weather strip A corresponding to a linear portion of a trunk lid has a true circular shape (FIG. 4), whereas a sealing portion 13a of a weather strip B corresponding to a projecting corner portion of the trunk lid is thick only in a side portion S (FIG. 5). In order to manufacture the weather strip in which the thickness of the sealing portion partially varies, in an extrusion device described in Patent Reference 1, a plurality of dies 2, 3, and 4 for a hollow sealing portion having different discharge port diameters are sequentially disposed in front of a die 1 for an attachment portion (trimmed portion) of a weather strip (FIG. 1). In addition, for example, in the die 2 for a sealing portion 13a, a sponge rubber material extrusion means 6 is connected to a connection structure 10 that is positioned at a position corresponding to the side portion S (FIG. 2). At an extrusion timing of the weather strip B corresponding to the projecting corner portion, the side portion S of the sealing portion 13a is made thick by increasing a screw rotation speed of the sponge rubber material extrusion means 6 to supply a large amount of rubber to the connection structure 10 of the die 2 (refer to Patent Reference 1, page 3, upper left column).

PRIOR ART REFERENCE

Patent Reference

Patent Reference 1: JP-A-S63-132022

SUMMARY OF THE INVENTION

Technical Problem

In Patent Reference 1, in order to make particularly the side portion S selectively thick in an annular cross-section of the sealing portion 13a of the weather strip B, a larger amount of rubber than that during typical extrusion is supplied (additionally supplied or excessively supplied) to the connection structure 10 of the die 2 at a predetermined extrusion timing. Therefore, in the annular cross-section of the sealing portion 13a, an extrusion amount of the rubber material per unit area (hereinafter, simply referred to as "extrusion amount") in the side portion S is higher than an extrusion amount of the rubber material in a portion other than the side portion S, and thus the extrusion amount tends to be non-uniform in a peripheral direction of the sealing portion 13a. Therefore, the side portion S in which the extrusion amount is relatively high has to keep pace with the portion other than the side portion S in which the extrusion amount is relatively low. As a result, the side portion S of the sealing portion 13a is formed in a corrugated shape in an extrusion direction (that is, in a longitudinal direction of the weather strip), which causes deterioration of the external appearance.

An object of the invention is to provide a method for manufacturing a weather strip in which a weather strip can be extruded while changing a wall thickness of a hollow sealing portion without deterioration in the external appearance of the hollow sealing portion. In addition, another object of the invention is to provide a weather strip including a hollow sealing portion in which a wall thickness partially varies.

Means for Solving the Problems

According to a first aspect of the present disclosure, there is provided a method for manufacturing an elongated weather strip for sealing a gap between a vehicle body opening portion and a door body according to an extrusion method using an extrusion die, the vehicle body opening portion being bordered with a peripheral portion, and the door body being capable of closing the vehicle body opening portion, wherein the elongated weather strip includes at least a first portion and a second portion in a longitudinal direction and a hollow sealing portion capable of coming into contact with the door body or the peripheral portion of the vehicle body opening portion, at least a part of a wall thickness of the hollow sealing portion being configured such that a wall thickness of the hollow sealing portion in the second portion is larger than a wall thickness of the hollow sealing portion in the first portion, wherein the extrusion die includes a die for molding at least an external shape of the hollow sealing portion and a core for molding an inner shape of the hollow sealing portion, wherein the core includes a movable core portion that is movable relative to the die along an extrusion direction, wherein the movable core portion is capable of being disposed at at least two positions including a first position that is a position for molding the first portion of the weather strip and a second position that is a position for molding the second portion of the weather strip, wherein the core is formed such that, regarding a cross-sectional shape of the core at an outlet position of the die, a cross-sectional shape of the core when the movable core portion is disposed at the first position is non-similar to a cross-sectional shape of the core when the movable core portion is disposed at the second position, and wherein the core is formed such that, regarding a cross-sectional area, at the die outlet position, of a molding space for the hollow sealing portion which is secured between the core and the die, a cross-sectional area of the molding space when the movable core portion is disposed at the second position is larger than a cross-sectional area of the molding space when the movable core portion is disposed at the first position, the method including: A) a step of molding the first portion of the weather strip in a state where the movable core portion is disposed at the first position; and B) a step of molding the second portion of the weather strip in a state where the movable core portion is disposed at the second position, wherein, in the step B), a supply amount per unit time of a material for the sealing portion to the molding space that is secured between the core and the die is larger than the supply amount in the step A).

In the step B) of disposing the movable core portion at the second position and molding the second portion of the weather strip, as compared to the step A) of disposing the movable core portion at the first position and molding the first portion of the weather strip, the cross-sectional area at the die outlet position of the molding space for the hollow sealing portion that is secured between the core and the die is increased, and the supply amount of the material for the sealing portion per unit time to the molding space is increased. Therefore, the supply amount of the rubber material for the sealing portion per unit area (unit cross-sectional area) can be made to be constant (uniform) at any position in the molding space. As a result, corrugation of the hollow sealing portion can be prevented, and the weather strip can be extruded while changing the wall thickness of the hollow sealing portion without deterioration in the external appearance of the hollow sealing portion.

According to a second aspect, the elongated weather strip further includes an attachment portion adjacent to the hollow sealing portion in a cross-section thereof, wherein the core includes the movable core portion and a fixed core portion that supports the movable core portion such that the movable core portion is movable along the extrusion direction, and wherein the fixed core portion extends along the extrusion direction in a state where the fixed core portion is integrated with the die and is disposed at a boundary between the molding space for the hollow sealing portion which is secured between the core and the die and a molding space for the attachment portion which is secured in the die.

According to the second aspect, the following effects can be obtained in addition to the effects of the configuration according to the first aspect. That is, the fixed core portion functions as a support member for supporting the movable core portion such that the movable core portion is stably movable along the extrusion direction. In addition, the fixed core portion that is positioned at the boundary between the molding space for the hollow sealing portion and the molding space for the attachment portion also functions as a partition material for preventing the material for the hollow sealing portion and the material for the attachment portion from being mixed with each other randomly, and a weather strip formed of two kinds of different materials can be manufactured.

According to a third aspect, the movable core portion has different cross-sectional shapes at at least two positions along the extrusion direction such that a cross-sectional shape, at the die outlet position, of the movable core portion disposed at the first position is non-similar to a cross-sectional shape, at the die outlet position, of the movable core portion disposed at the second position and such that a cross-sectional area, at the die outlet position, of the movable core portion disposed at the first position is larger than a cross-sectional area, at the die outlet position, of the movable core portion disposed at the second position.

According to the third aspect, the following effects can be obtained in addition to the effects of the configurations according to the first and second aspects. That is, the movable core portion is formed so as to have the non-similar different cross-sections at at least two positions along the extrusion direction as described above. As a result, when the movable core portion is disposed at the second position to mold the second portion of the weather strip, the cross-sectional area of the molding space for the hollow sealing portion at the die outlet position can be made to be larger than that when the movable core portion is disposed at the first position.

According to a fourth aspect, the cross-sectional shape, at the die outlet position, of the movable core portion disposed at the second position corresponds to a shape obtained by partially cutting the cross-sectional shape, at the die outlet position, of the movable core portion disposed at the first position.

According to the fourth aspect, the following effects can be obtained in addition to the effects of the configuration according to the third aspect. That is, by using the movable core portion according to the fourth aspect, the weather strip can be extruded such that the cross-sectional shape of the hollow sealing portion in the second portion of the weather strip is partially larger than that of the hollow sealing portion in the first portion.

According to a fifth aspect, there is provided an elongated weather strip for sealing a gap between a vehicle body opening portion and a door body, the vehicle body opening portion being bordered with a peripheral portion, and the door body being capable of closing the vehicle body opening portion, wherein the elongated weather strip includes at least a first portion and a second portion in a longitudinal direction, a hollow sealing portion capable of coming into contact with the door body or the peripheral portion of the vehicle body opening portion, and an attachment portion adjacent to the hollow sealing portion, wherein, in a cross-section of the hollow sealing portion, the hollow sealing portion is capable of being divided into a base side portion where the hollow sealing portion is adjacent to the attachment portion and a top side portion that is a remaining portion of the hollow sealing portion other than the base side portion, wherein a wall thickness of the base side portion in the first portion and a wall thickness of the base side portion in the second portion are substantially the same as each other, and a wall thickness of the top side portion in the second portion is larger than a wall thickness of the top side portion in the first portion, and wherein an external shape of the hollow sealing portion in the cross-section is configured such that an external shape in the second portion is larger than an external shape in the first portion.

When the weather strip is attached to the vehicle body, the first portion is mainly disposed at the side portion in the peripheral portion of the vehicle body opening portion, and the second portion is mainly disposed at the corner portion in the peripheral portion of the vehicle body opening portion. At this time, the wall thickness of the base side portion of the hollow sealing portion in the first portion and the wall thickness of the base side portion of the hollow sealing portion in the second portion are substantially the same as each other. Therefore, the hollow sealing portion of the second portion can be easily bent while making the sealing portion smoothly conform to a curved shape of the corner portion. On the other hand, the wall thickness of the top side portion of the hollow sealing portion in the second portion is larger than that in the first portion, and the rigidity of the hollow sealing portion of the second portion is high. Therefore, even in a case where the second portion is bent, unnatural crushing or corrugation of the hollow sealing portion can be prevented as much as possible. Further, the external shape of the cross-section of the hollow sealing portion in the second portion is larger than that in the first portion. Therefore, even in a case where the second portion is bent such that an upper end of the hollow sealing portion of the second portion is slightly lowered, the heights of the first portion and the second portion can be made to be substantially the same after the completion of the attachment of the weather strip to the vehicle body, and thus the height of a seal surface can be made to be uniform.

Advantageous Effects of the Invention

In the method for manufacturing a weather strip according to the invention, the weather strip can be extruded while changing the wall thickness of the hollow sealing portion without deterioration in the external appearance of the hollow sealing portion. In addition, the weather strip according to the invention includes the weather strip including the hollow sealing portion in which the wall thickness partially varies. As a result, the attachment performance of the weather strip to the vehicle body and the sealing performance after the attachment can be improved.

BRIEF DESCRIPTION OF DRAWINGS

FIG. 1 illustrates the outline of a back door opening portion of an automobile, wherein (A) is a perspective view illustrating a state where a weather strip according to a first embodiment is mounted and (B) is a perspective view illustrating a state where the weather strip is not mounted.

FIG. 11 illustrates a modification of the first embodiment, in which (A) is an enlarged front view illustrating an annular molding space for a sealing portion and the vicinity thereof and (B) is a plan view illustrating the vicinity of a distal end portion of a movable core portion.

FIG. 13 illustrates the outline of a back door opening portion of an automobile, wherein (A) is a perspective view illustrating a state where a weather strip according to a second embodiment is mounted and (B) is a perspective view illustrating a state where the weather strip is not mounted.

In FIGS. 18, (A) and (B) are schematic cross-sectional views taken along line R-R of FIG. 17.

MODE FOR CARRYING OUT THE INVENTION

Figure 2:
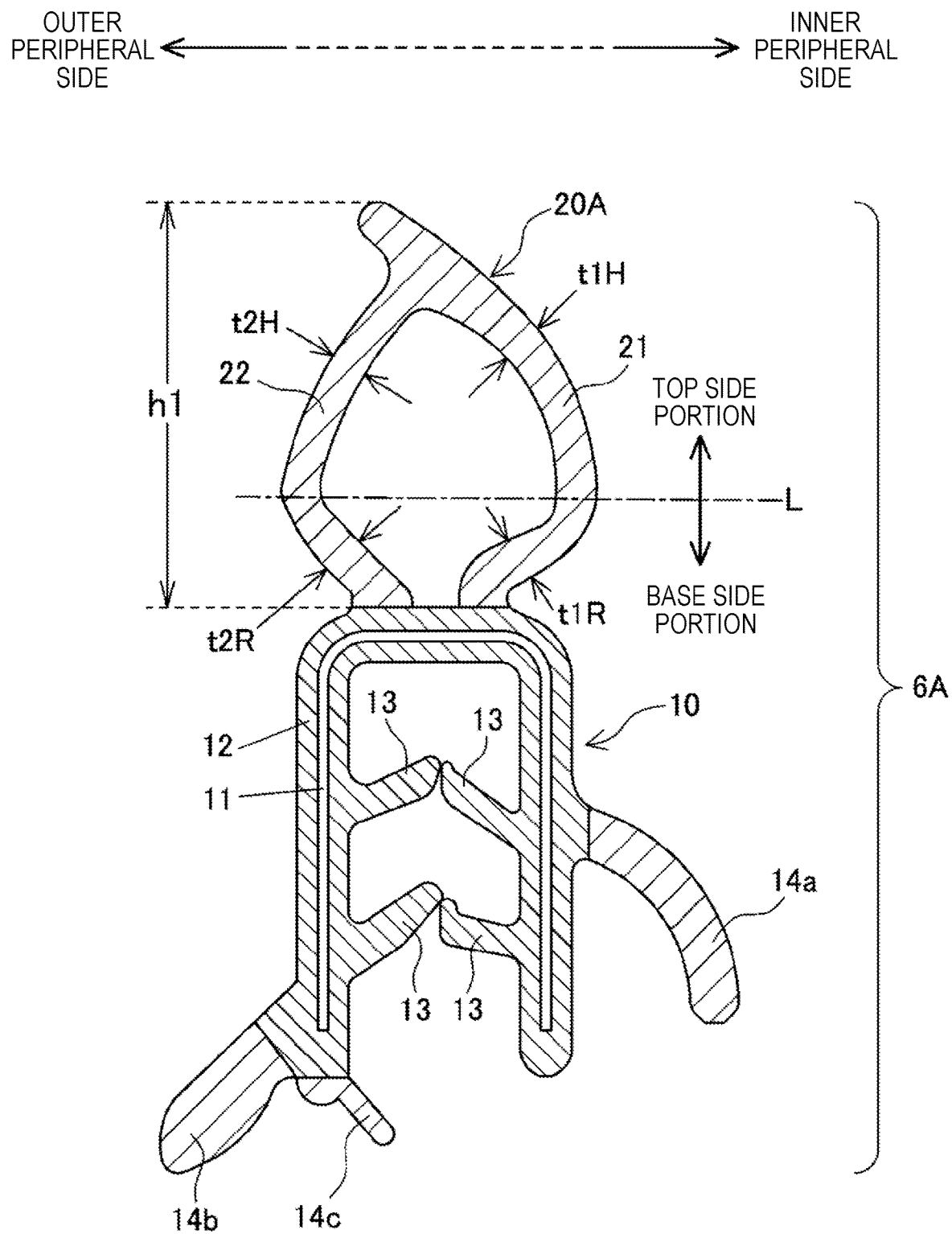
FIG. 2 is a cross-sectional view of the weather strip taken along line II-II of FIG. 1.

Some embodiments of a weather strip according to the invention and a method for manufacturing the same will be described below.

First Embodiment (A) and (B) of FIG. 1 illustrate a back door opening portion 3 of a general two-box automobile 1 in a state where a back door 2 is flipped up. The reference numeral "1a" represents a roof of the vehicle, and the reference numeral "1b" represents a pillar portion of a vehicle rear portion.

As illustrated in (B) of FIG. 1, a peripheral portion of the back door opening portion 3 is bordered with a combination of substantially four side portions (4a, 4b, 4c) and substantially four corner portions (5a, 5c). The four side portions include: an upper side portion 4a that extends substantially horizontally along an upper edge (a rear edge of the roof 1a) of the back door opening portion 3; a pair of left and right lateral side portions 4b that extends along the pillar portion 1b in an up-down direction; and a lower side portion 4c that extends substantially horizontally along a lower edge of the back door opening portion 3. The four corner portions include: a pair of left and right upper corner portions 5a that are positioned between the upper side portion 4a and the two lateral side portions 4b; and a pair of left and right lower corner portion 5c that are positioned between the lower side portion 4c and the two lateral side portions 4b.

(A) of FIG. 1 illustrates a state where a weather strip 6 is mounted on the peripheral portion of the back door opening portion 3. The weather strip 6 is formed in an annular shape (or an endless strip shape) corresponding to the peripheral portion of the back door opening portion 3, and is configured as an elongated rubber member having a length corresponding to the entire peripheral length of the peripheral portion of the back door opening portion 3 including the side portions and the corner portions. As described below in detail, the weather strip 6 according to the first embodiment includes at least a lateral side corresponding portion 6A as a first portion and a corner corresponding portion 6B, an lower side corresponding portion 6C, and an upper side corresponding portion 6D as a second portion. The shape and dimension of a cross-section of the weather strip 6 according to the first embodiment varies depending on positions along a longitudinal direction.

In the specification, the drawings, and the claims of the present application, "inner peripheral side" and "outer peripheral side" are used as terms for specifying a direction or an orientation. Here, in a state where the weather strip 6 is mounted on the back door opening portion 3, "the inner peripheral side" of the weather strip 6 refers to a side facing the inner side (center region) of the peripheral portion of the back door opening portion 3, and "outer peripheral side" of the weather strip 6 refers to a side facing the outer side (outer surrounding environment) of the peripheral portion of the back door opening portion 3.

FIG. 2 illustrates a cross-section taken along line II-II of (A) of FIG. 1, that is, a cross-section of a lateral side corresponding portion 6A of the weather strip 6 that is attached to the lateral side portion 4b of the back door opening portion 3. As illustrated in the drawing, the lateral side corresponding portion 6A includes: an attachment portion 10; and a sealing portion 20A having a hollow tunnel shape that is disposed adjacent to and integrated with the attachment portion 10.

As illustrated in FIG. 2, the attachment portion 10 is a portion that is directly attached to a flange (not illustrated) as an attached member provided along the peripheral portion of the back door opening portion 3, and includes: a core 11 formed of metal (hereinafter, also referred to as "core metal 11") that is bent in an "inverted U-shape" in cross-section; and a rubber cover portion 12 that is attached to cover the core metal 11. In an inner portion of the rubber cover portion 12, four holding lips 13 that protrude from inner surfaces thereof are provided. The flange is interposed between the holding lips 13 such that the weather strip 6 is fixed to the peripheral portion of the back door opening portion 3. In addition, in an outer side portion of the rubber cover portion 12 and the vicinity of one end portion (in FIG. 2, the vicinity of a left lower end portion) of the attachment portion 10, three auxiliary lips (an interior lip 14a, an exterior lip 14b, and a distal lip 14c) are provided to protrude from outer surfaces thereof. Among the three auxiliary lips, the interior lip 14a is a cover lip for covering an end portion of an interior material such as a carpet or a cloth material. In addition, the exterior lip 14b and the distal lip 14c are lips for sealing gaps between the vehicle body and the attachment portion 10 when the weather strip 6 is mounted on the back door opening portion 3.

Further, as illustrated in FIG. 2, the sealing portion 20A having a hollow tunnel shape is provided adjacent to the upper side of the attachment portion 10. The sealing portion 20A includes an inner peripheral side wall portion 21 and an outer peripheral side wall portion 22. The sealing portion 20A is surrounded by the wall portions 21 and 22 such that a tunnel-shaped hollow region having a substantially rhombic shape in cross-section is secured in the sealing portion 20A. For convenience of description, in a cross-sectional view, the sealing portion 20A can be divided into a base side portion and a top side portion based on a boundary line L that is a line (indicated by a horizontal chain line in FIG. 2) drawn along one diagonal line of the rhombic shape formed by the wall portions 21 and 22. "Base side portion" refers to a portion adjacent to the attachment portion 10, and "top side portion" refers to a remaining portion other than the base side portion. Wall thicknesses of respective portions of the sealing portion 20A are set as follows.

Wall thickness of inner peripheral side wall portion 21 of sealing portion 20A in top side portion: t1H Wall thickness of inner peripheral side wall portion 21 of sealing portion 20A in base side portion: t1R Wall thickness of outer peripheral side wall portion 22 of sealing portion 20A in top side portion: t2H Wall thickness of outer peripheral side wall portion 22 of sealing portion 20A in base side portion: t2R In addition, the height of the sealing portion 20A based on a top surface of the attachment portion 10 is set as h1. This height h1 is one index indicating the size of an external shape of the sealing portion in the cross-section of the sealing portion 20A.

Incidentally, a rubber material which forms the rubber cover portion 12 and the four holding lips 13 in the attachment portion 10 is obtained, for example, by adding carbon black and a vulcanizing agent to EPDM (ethylene propylene diene copolymer). During the manufacturing process described below, vulcanization (that is, a polymer crosslinking reaction) using the vulcanizing agent is performed. On the other hand, a rubber material which forms the three auxiliary lips 14a to 14c and the sealing portion 20A in the attachment portion 10 is obtained, for example, by adding carbon black, a vulcanizing agent, and a foaming agent to EPDM. During the manufacturing process described below, vulcanization (that is, a polymer crosslinking reaction) using the vulcanizing agent and foaming (sponging) using the foaming agent are performed. Examples of the foaming agent which can be used herein include 4,4'-oxybis(benzenesulfonyl hydrazide) (OBSH) (for example, trade name: NEOCELLBORN, manufactured by Eiwa Chemical Ind. Co., Ltd.), azodicarbonamide (ADCA), a thermally expandable microcapsule (for example, trade name: ADVANSEL, manufactured by Sekisui Chemical Co., Ltd.), and a physical foaming agent (for example, water or carbon dioxide gas). Incidentally, the EPDM sponge rubber material which foams with the foaming agent is softer and has higher flexibility than the EPDM vulcanized rubber material used for forming the rubber cover portion and the like.

In the weather strip 6 according to the first embodiment, the upper side corresponding portion 6D and the lower side corresponding portion 6C that are attached to the upper side portion 4a and the lower side portion 4c of the back door opening portion 3, respectively, have substantially the same cross-sectional shape and dimension as the lateral side corresponding portion 6A.

Figure 3:
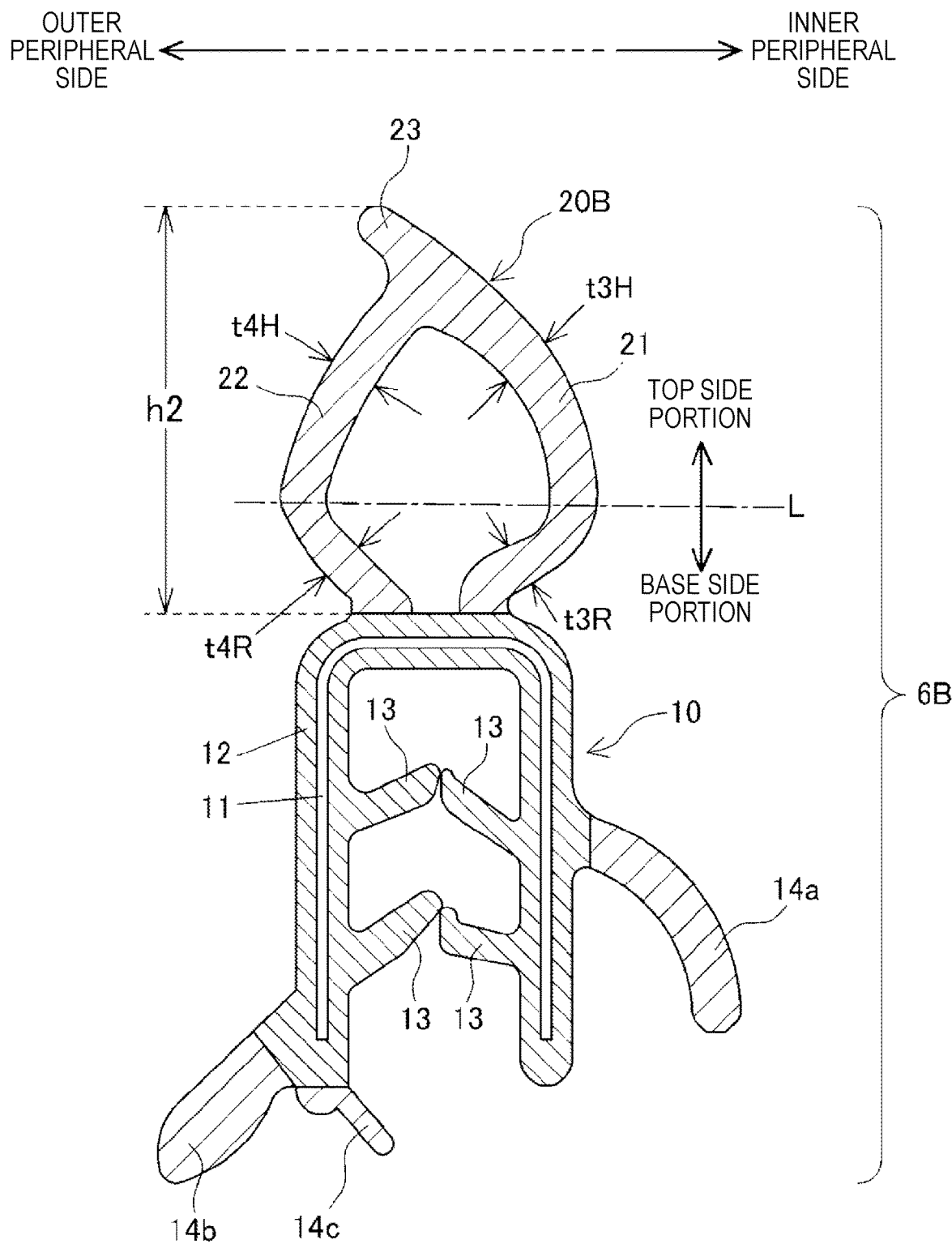
FIG. 3 is a cross-sectional view of the weather strip taken along line III-III of FIG. 1.

FIG. 3 illustrates a cross-section taken along line III-III of (A) of FIG. 1, that is, a cross-section of a corner corresponding portion 6B of the weather strip 6 that is attached to the corner portion 5a of the back door opening portion 3. The corner corresponding portion 6B also includes the attachment portion 10 and a sealing portion 20B having a hollow tunnel shape. The attachment portion 10 of the corner corresponding portion 6B has substantially the same shape and dimension as the attachment portion 10 of the lateral side corresponding portion 6A.

As in the sealing portion 20A of the lateral side corresponding portion 6A, the sealing portion 20B of the corner corresponding portion 6B includes the inner peripheral side wall portion 21 and the outer peripheral side wall portion 22. The sealing portion 20B is surrounded by the wall portions 21 and 22 such that a tunnel-shaped hollow region having a substantially rhombic shape in cross-section is secured in the sealing portion 20B. For convenience of description, in a cross-sectional view, the sealing portion 20B can be divided into a base side portion and a top side portion based on a boundary line L that is a line (indicated by a horizontal chain line in FIG. 3) drawn along one diagonal line of the rhombic shape formed by the wall portions 21 and 22. Wall thicknesses of respective portions of the sealing portion 20B are set as follows.

Wall thickness of inner peripheral side wall portion 21 of sealing portion 20B in top side portion: t3H Wall thickness of inner peripheral side wall portion 21 of sealing portion 20B in base side portion: t3R Wall thickness of outer peripheral side wall portion 22 of sealing portion 20B in top side portion: t4H Wall thickness of outer peripheral side wall portion 22 of sealing portion 20B in base side portion: t4R In addition, the height of the sealing portion 20B based on a top surface of the attachment portion 10 is set as h2. This height h2 is one index indicating the size of an external shape of the sealing portion in the cross-section of the sealing portion 20B.

The wall thicknesses of the respective portions in the wall portions 21 and 22 of the lateral side corresponding portion 6A and the wall thicknesses of the respective portions in the wall portions 21 and 22 of the corner corresponding portion 6B are set such that the following relationships are satisfied.

Wall thicknesses of inner peripheral side wall portions 21 in top side portion: t1H<t3H Wall thicknesses of outer peripheral side wall portions 22 in top side portion: t2H<t4H Wall thicknesses of inner peripheral side wall portions 21 in base side portion: t1R=t3R Wall thicknesses of outer peripheral side wall portions 22 in base side portion: t2R=t4R That is, the wall thicknesses of the base side portions of the sealing portions in the lateral side corresponding portion 6A and the corner corresponding portion 6B are substantially the same as each other. As a result, the base side portion of the sealing portion 20A of the lateral side corresponding portion 6A and the base side portion of the sealing portion 20B of the corner corresponding portion 6B have substantially the same shape and dimension, and there is substantially no difference therebetween. On the other hand, regarding the wall thicknesses of the top side portion of the sealing portion, the wall thicknesses (t3H, t4H) of the corner corresponding portion 6B are larger than the wall thicknesses (t1H, t2H) of the lateral side corresponding portion 6A. As a result, the top side portion of the corner corresponding portion 6B is larger than the top side portion of the lateral side corresponding portion 6A as a whole.

In addition, the height h2 of the sealing portion 20B in the corner corresponding portion 6B is larger than the height h1 of the sealing portion 20A in the lateral side corresponding portion 6A (h1<h2). In other words, the external shape of the cross-section of the sealing portion 20B is larger than the external shape of the cross-section of the sealing portion 20A.

In the weather strip 6 according to the first embodiment, the lateral side corresponding portion 6A as the first portion is disposed on the lateral side portion 4b of the back door opening portion 3, and the corner corresponding portion 6B as the second portion is disposed on the corner portion 5a of the back door opening portion 3. At this time, the wall thicknesses of the base side portions of the sealing portions 20A and 20B in the lateral side corresponding portion 6A and the corner corresponding portion 6B are substantially the same as each other. Therefore, the sealing portion 20B can be easily bent while making the sealing portion 20B smoothly conform to a curved shape of the corner portion 5a. On the other hand, the wall thicknesses of the top side portions of the sealing portions 20A and 20B in the corner corresponding portion 6B is larger than that in the lateral side corresponding portion 6A, and the rigidity of the sealing portion 20B in the corner corresponding portion 6B is relatively high. Therefore, unnatural crushing or corrugation of the sealing portion 20B caused by the corner corresponding portion 6B being bent can be prevented.

Further, the embodiment also has the following advantageous effects. That is, even in a case where the weather strip 6 according to the embodiment is mounted on the back door opening portion 3, the lateral side corresponding portion 6A is attached to the lateral side portion 4b that extends substantially linearly. Therefore, the sealing portion 20A is not deformed during the mounting, and the height of the sealing portion 20A is maintained at h1 even after the mounting. On the other hand, the corner corresponding portion 6B is attached to the corner portion 5a where the curvature is locally large. Therefore, during the mounting, the sealing portion 20B is unavoidably affected by a bending operation at the time of the attachment. This effect appears as deformation that makes a rhombic shape in cross-section flat in the height direction. Specifically, in FIG. 3, the deformation of the sealing portion 20B occurs such that an upper end portion 23 of the sealing portion 20B lowers (or sinks) toward the attachment portion 10. As a result, the height of the sealing portion 20B after the mounting is slightly lower than h2 which is the initially set height. It is preferable that the amount of lowering (amount of sinking) Δh of the height of the sealing portion caused by the bending deformation during the mounting is estimated in advance to set the dimension of the initial height h2=(h1+Δh) of the sealing portion 20B. By setting the dimension in advance as described above, in a case where the weather strip 6 is mounted on the back door opening portion 3, the height of the sealing portion 20A corresponding to the lateral side portion 4b and the height of the sealing portion 20B corresponding to the corner portion 5a can be made to be substantially the same (that is, h1). As a result, the height of the sealing portion after the mounting can be made to be uniform, and sealing characteristics (or sealing quality) can be made to be substantially uniform over the entire peripheral length of the back door opening portion 3.

[Extrusion Facility and Method for Manufacturing Weather Strip]

Figure 4:
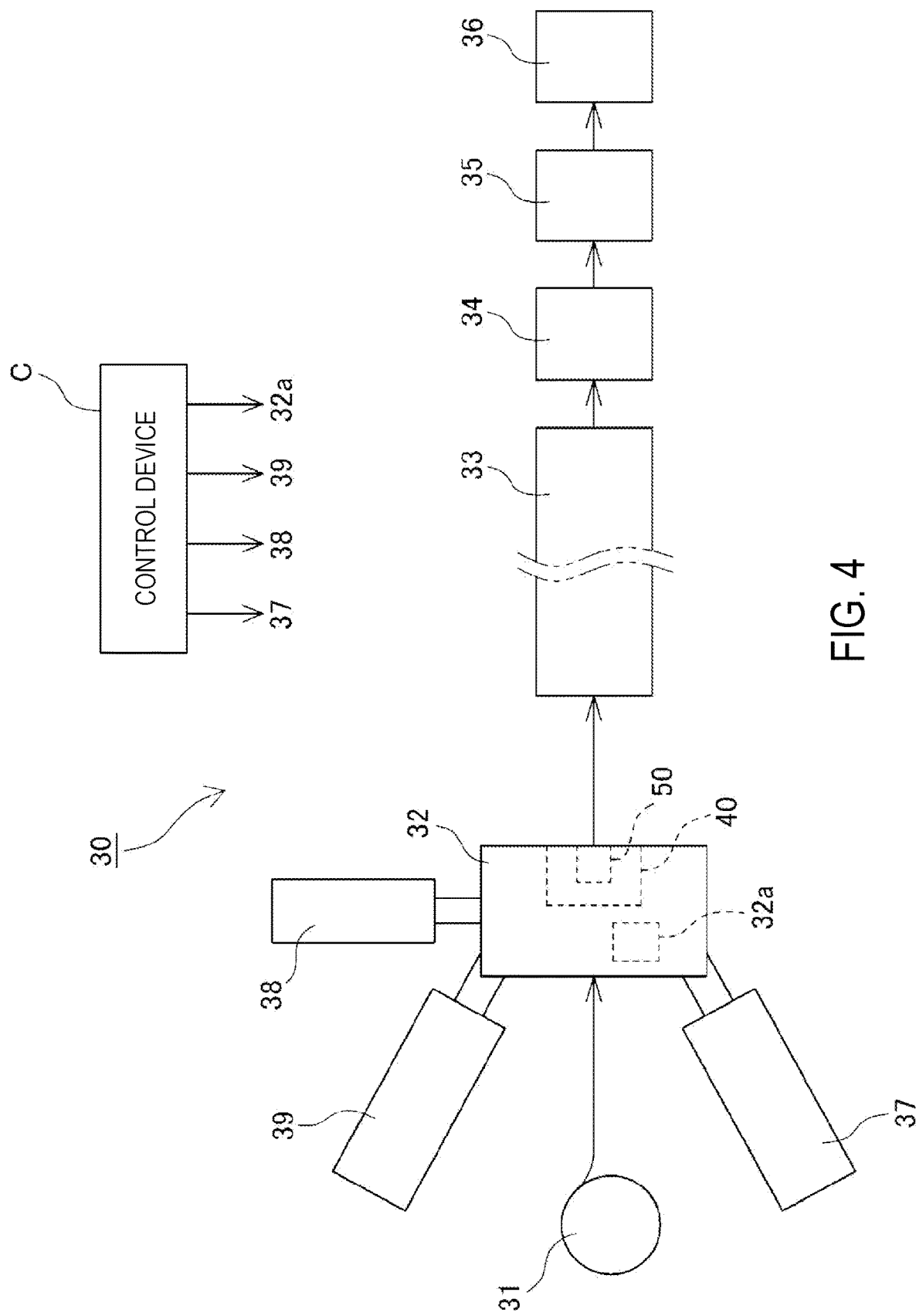
FIG. 4 is a plan view schematically illustrating the arrangement of a manufacturing line of an extrusion manufacturing facility.

Next, the summary of an extrusion facility will be described with reference to FIGS. 4 to 8. FIG. 4 illustrates the summary of a manufacturing line 30 of the extrusion facility. The manufacturing line 30 is configured by arranging in series an uncoiler 31 for supplying the core metal, a head 32 for extrusion, a heating tank 33, a cooling machine 34, a core metal bending machine 35, and a hauling machine 36.

The uncoiler 31 for supplying the core metal is an uncoiling and supplying mechanism of the core metal 11 that supplies the linearized core metal 11 to the head 32 while uncoiling a core metal coil (not illustrated) that is obtained by coiling the belt-shaped core metal 11. The head 32 is an extrusion die including a die 40 and a core 50 as die elements, and receives the supply of rubber materials for extrusion from first, second, and third material extruders 37, 38, and 39. The details of the head 32 will be described below.

The heating tank 33 is a heating oven having an elongated tunnel shape for vulcanization and foaming, and the entire length ranges from several meters to several tens of meters.

A heating method in the heating tank 33 may be, for example, either or both hot air heating using combustion gas or the like and microwave heating. The cooling machine 34 is a device for cooling a semi-finished product (intermediate product) after vulcanization and foaming, and is typically configured of a water tank filed with cooling water. By causing the semi-finished product to pass through the water tank, the semi-finished product is cooled to an appropriate temperature. The core metal bending machine 35 is a mechanical device for bending each core metal of the semi-finished product having passed through the cooling machine 34 to impart a final shape of the weather strip to the rubber product. The hauling machine 36 is a device for taking up the rubber product to which the final shape is imparted.

As illustrated in FIG. 4, the head 32 is connected to the three material extruders 37, 38, and 39 in total. The first material extruder 37 supplies a rubber material for the rubber cover portion 12 and the holding lip 13, which is an EPDM rubber material including a vulcanizing agent, to the head 32. The second material extruder 38 supplies a rubber material for the auxiliary lips 14a to 14c, which is an EPDM rubber material including a vulcanizing agent and a foaming agent, to the head 32. The third material extruder 39 supplies a rubber material for the sealing portions 20A and 20B, which is an EPDM rubber material including a vulcanizing agent and a foaming agent, to the head 32. The three material extruders 37 to 39 and the head 32 (in particular, a driving mechanism 32a of a movable body) are electrically connected to a control device C. The control device C is constituted by, for example, a computer or a programmable sequencer having a factory automation (FA) specification, and controls the head 32 and the material extruders 37 to 39 according to a predetermined control program or control sequence.

Figure 5:
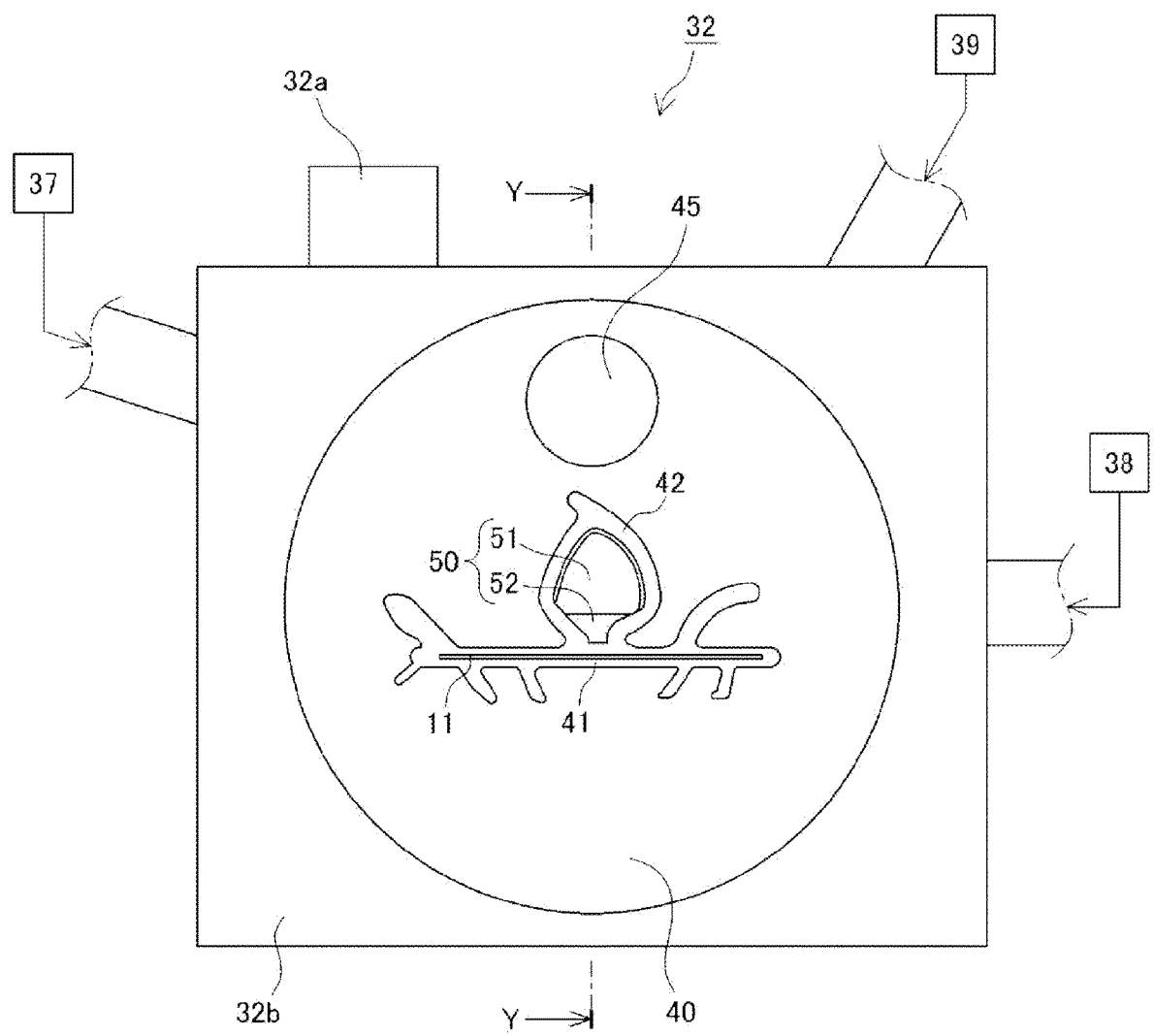
FIG. 5 is a front view illustrating a head for extrusion when seen from the front side (the downstream side of the manufacturing line).
Figure 6:
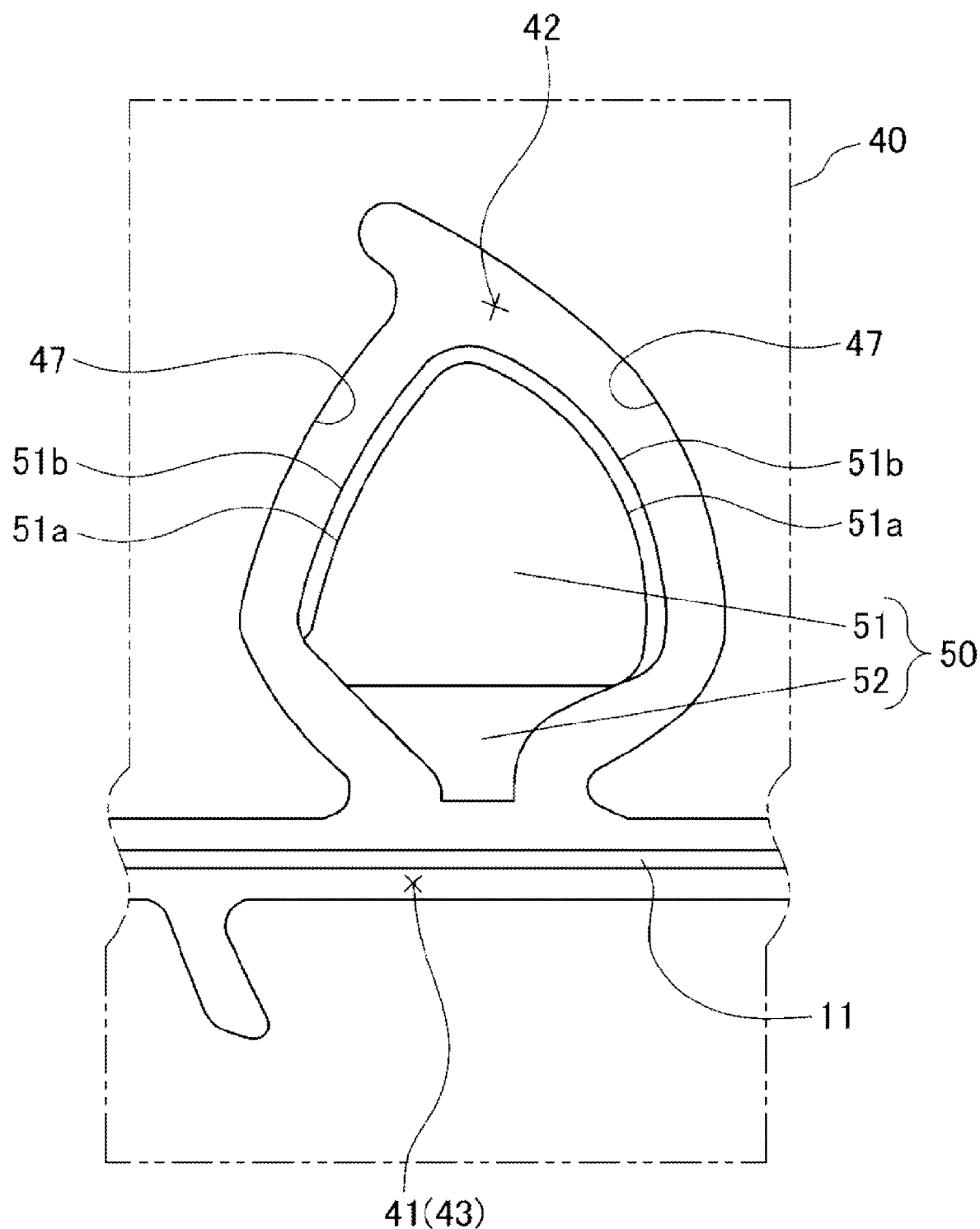
FIG. 6 is an enlarged front view illustrating an annular molding space for a sealing portion and the vicinity thereof.

The head 32 includes: the die 40 for extruding the external shape of the weather strip 6; and the core 50 for mainly forming inner wall portions of the sealing portions 20A and 20B having a hollow tunnel shape. As illustrated in FIGS. 5 and 6, the die 40 that is supported by a frame 32b of the head 32 includes molding spaces (41, 42) for extrusion that are partitioned substantially at the center of the die 40. A lower half portion 41 of the molding space is a molding space (molding region) that extends substantially horizontally to extrude the attachment portion 10 of the weather strip, and has a width such that the core metal 11 that extends linearly in the horizontal direction before being bent can be accommodated therein and can pass therethrough. An upper half portion 42 of the molding space provides an annular molding space (molding region) for extruding the sealing portions 20A and 20B of the weather strip in cooperation with the core 50. Here, "annular" described in this specification refers to a cross-sectional shape of a closed thick portion in which a tunnel is formed, and does not refer to a circular shape in a geometrically strict sense.

Figure 7:
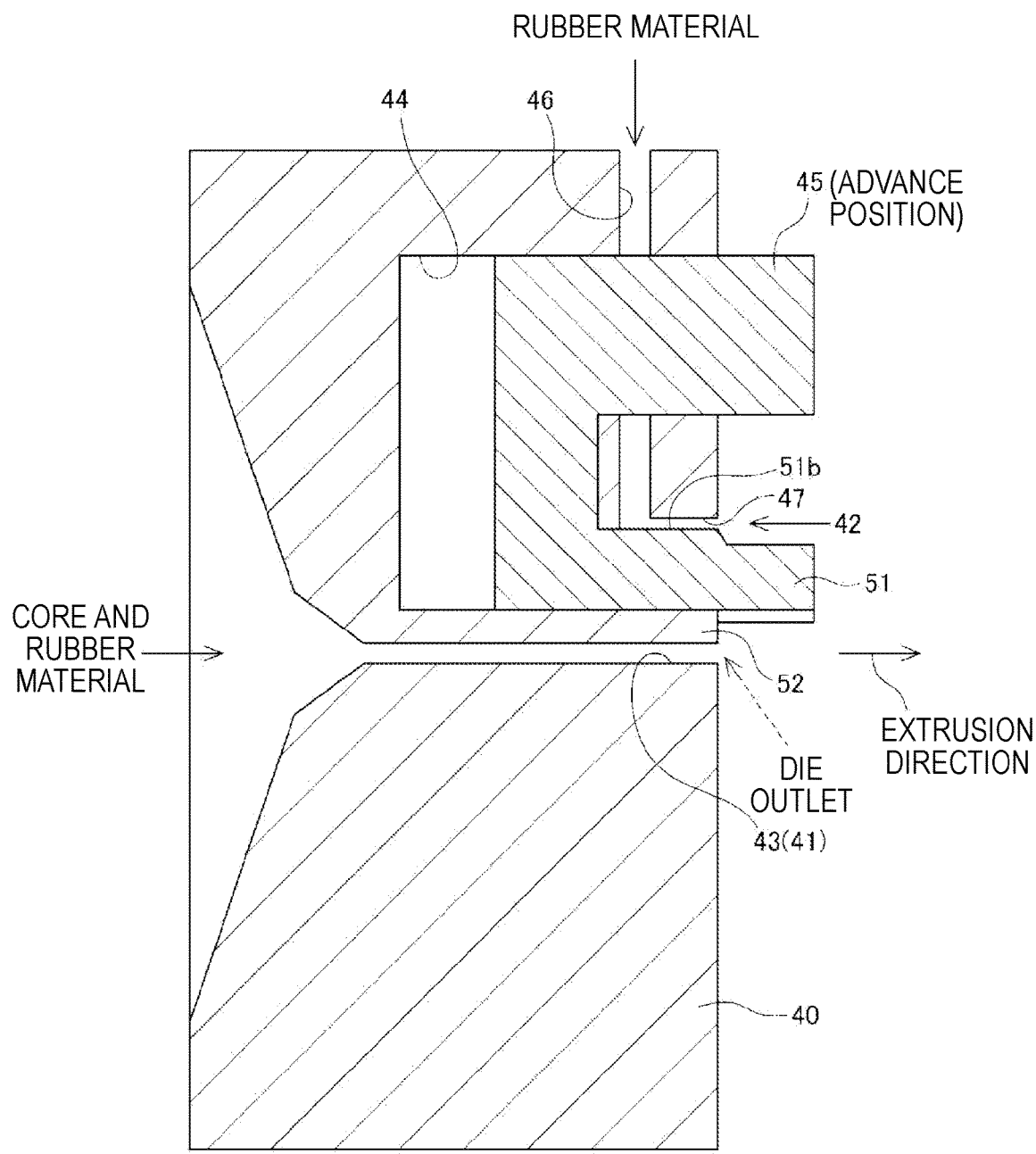
FIG. 7 is a longitudinal sectional view (corresponding to a cross-section taken along line Y-Y of FIG. 5) of the head for extrusion when a movable core portion advances.
Figure 8:
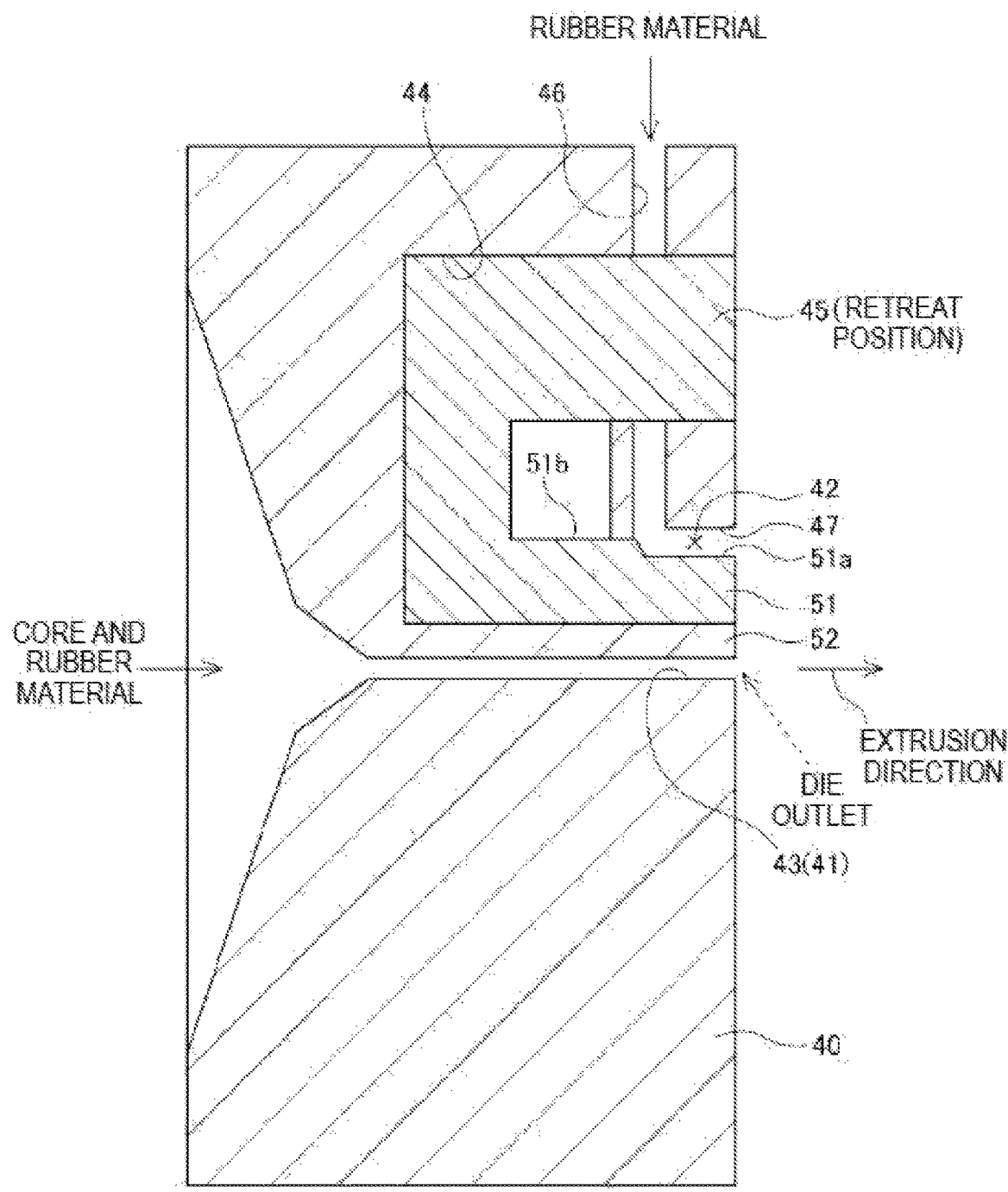
FIG. 8 is a longitudinal sectional view (corresponding to a cross-section taken along line Y-Y of FIG. 5) of the head for extrusion when the movable core portion retreats.

FIGS. 7 and 8 are schematic longitudinal sectional views of the die 40 and the core 50 taken along line Y-Y of FIG. 5. As illustrated in FIGS. 7 and 8, in a center region of the die 40, the core metal 11 and a supply path (main supply path 43) of the rubber material that extend along an extrusion direction (direction from the left to the right of each of the drawings) are provided, and the vicinity of a die outlet downstream of the main supply path 43 is positioned as "molding space 41 for the attachment portion". On the other hand, an accommodation recessed portion 44 is provided in the upper half portion region of the die 40, and a movable body 45 is held in the accommodation recessed portion 44 so as to reciprocate back and forth along the extrusion direction. The movable body 45 is driven back and forth by the driving mechanism 32a (refer to FIGS. 4 and 5) for the movable body. A part (lower portion) of the movable body 45 functions as a movable core portion 51.

As illustrated in FIGS. 5 to 8, the core 50 positioned above the main supply path 43 (and the molding space 41 for the attachment portion) includes the movable core portion 51 that is a part of the movable body 45 and a fixed core portion 52. The fixed core portion 52 is positioned immediately above a center position of the main supply path 43 in the width direction (refer to FIGS. 5 and 6), and is formed as an elongated portion (for example, a monorail-shaped portion) that extends along the extrusion direction (refer to FIGS. 7 and 8). A rear end portion of the fixed core portion 52 is connected to a main body portion of the die 40, and the fixed core portion 52 is integrated with the die 40. In addition, the fixed core portion 52 is positioned at a boundary between the molding space 41 for the attachment portion and the annular molding space 42 for the sealing portion in the weather strip, supports the movable body 45, and supports the movable core portion 51, which is a part of the movable body 45, such that the movable core portion 51 is movable back and forth along the extrusion direction.

As illustrated in FIGS. 7 and 8, a supply path (auxiliary supply path 46) of the rubber material for the sealing portion that extends substantially in the vertical direction is provided in the die 40 and in the vicinity of the accommodation recessed portion 44. A lower end portion of the auxiliary supply path 46 is connected to the annular molding space 42 for the sealing portion.

As illustrated in FIGS. 6 to 8, in the vicinity of the outlet of the die 40, a facing surface 47 for molding that faces outer peripheral surfaces (51a, 51b) of the movable core portion 51 with a predetermined distance therebetween is formed. The annular molding space 42 for the sealing portion is secured between the facing surface 47 for molding and the core (51, 52). The outer peripheral surfaces (51a, 51b) of the movable core portion 51 are formed with a step such that there is a difference in the cross-sectional area of the movable core portion 51 between an upstream side portion and a downstream side portion along the extrusion direction. Specifically, the movable core portion 51 includes: the first outer peripheral surface 51a that is positioned close to the distal end; and the second outer peripheral surface 51b that is positioned rear to the first outer peripheral surface 51a. The second outer peripheral surface 51b is formed to be positioned above the first outer peripheral surface 51a. As a result, the first outer peripheral surface 51a corresponds to a small cross-sectional area portion of the movable core portion 51 having a relatively small cross-sectional area, and the second outer peripheral surface 51b corresponds to a large cross-sectional area portion of the movable core portion 51 having a larger cross-sectional area than the small cross-sectional area portion. Accordingly, as illustrated in FIG. 7, in a case where the movable body 45 is disposed at an advance position (first position) and the second outer peripheral surface 51b of the movable core portion is disposed to face the facing surface 47 for molding of the die outlet, the width (or the cross-sectional area) of the annular molding space 42 for the sealing portion is relatively small. On the other hand, as illustrated in FIG. 8, in a case where the movable body 45 is disposed at a retreat position (second position) and the first outer peripheral surface 51a of the movable core portion is disposed to face the facing surface 47 for molding of the die outlet, the width (or the cross-sectional area) of the annular molding space 42 for the sealing portion is relatively large.

In a case where this point is expressed in another way, the cross-sectional shape, at the die outlet position, of the movable core portion 51 (or the entire core 50) disposed at the retreat position (second position) corresponds to a shape obtained by cutting one portion corresponding to an upper substantially semicircular portion from the cross-sectional shape, at the die outlet position, of the movable core portion 51 (or the entire core 50) disposed at the advance position (first position) (refer to FIG. 6). In this way, the movable core portion 51 (and the entire core 50) is configured to have different cross-sectional shapes at at least two positions along the extrusion direction (positions having different cross-sectional shapes).

Next, a method for manufacturing a weather strip using the extrusion facility will be described. The weather strip 6 according to the first embodiment is manufactured through an extrusion process using the head 32, a vulcanizing and foaming treatment process, and a post-treatment and post-processing process.

In the extrusion process, a weather strip semi-finished product 6' (refer to FIG. 9) is extruded while appropriately switching the disposition of the movable core portion 51 as a part of the movable body 45 between the advance position (first position) and the retreat position (second position). That is, when the sealing portion 20A of the lateral side corresponding portion 6A as the first portion of the weather strip 6 is extruded, the movable body 45 and the movable core portion 51 are disposed at the advance position (FIG. 7) as the first position, and the second outer peripheral surface 51b of the movable core portion 51 is disposed to face the facing surface 47 for molding of the die 40. On the other hand, when the sealing portion 20B of the corner corresponding portion 6B as the second portion of the weather strip 6 is extruded, the movable body 45 and the movable core portion 51 are disposed at the retreat position (FIG. 8) as the second position, and the first outer peripheral surface 51a of the movable core portion 51 is disposed to face the facing surface 47 for molding of the die 40. In this way, by performing the extrusion while appropriately switching the disposition of the movable core portion 51, a semi-finished product of the elongated weather strip in which the sealing portions 20A and 20B having a hollow tunnel shape are continuous in the longitudinal direction can be extruded.

In the extrusion process, the control device C changes the screw rotation speed of the third material extruder 39 that supplies the rubber material for the sealing portion to the head 32 in accordance with a back-and-forth movement schedule of the movable core portion 51 so as to adjust the supply amount of the rubber material to the annular molding space 42 in the die 40. Specifically, in a case where the extrusion process is in an extrusion step (FIG. 7) of the first portion (lateral side corresponding portion) 6A (that is, the sealing portion 20A), the screw rotation speed of the third material extruder 39 is reduced to relatively reduce the supply amount per unit time of the rubber material for the sealing portion. On the other hand, in a case where the extrusion process is in an extrusion step (FIG. 8) of the second portion (corner corresponding portion) 6B (that is, the sealing portion 20B), the screw rotation speed of the third material extruder 39 is increased (acceleration) to relatively increase the supply amount per unit time of the rubber material for the sealing portion. Due to the control of the supply amount of the rubber material, a situation in which the sealing portions 20A and 20B of the obtained weather strip cannot be molded in a desired shape can be avoided. Specifically, a situation in which the rubber material is insufficient in the sealing portion 20B that includes a part having a larger wall thickness than the sealing portion 20A can be avoided, and the formation of cracks or holes caused by the insufficient material in the sealing portion 20B can be prevented in advance. Further, by performing the control of the supply amount of the rubber material, the supply amount per unit area of the rubber material for the sealing portion can be made to be constant (uniform) at any position in the annular molding space 42 for the sealing portion. As a result, in the obtained weather strip, corrugation of a part of the sealing portion 20B of the corner corresponding portion 6B can be avoided, and the entire surface of the sealing portion 20B can be made to be smooth.

In the embodiment, instead of synchronizing (completely matching) a switching timing of the position of the movable body 45 (and the movable core portion 51) and the switching timing of the screw rotation speed of the third material extruder 39 with each other, the control device C changes the screw rotation speed of the material extruder 39 at a timing that is earlier than the switching timing of the movable core portion 51 by a predetermined time (D). This predetermined time (D) is set in consideration of a time lag from the time at which the screw rotation speed of the material extruder 39 changes to the time at which a change of the material supply amount corresponding to the change of the screw rotation speed actually occurs in the annular molding space 42. That is, in the embodiment, by adopting the control method of changing the screw rotation speed of the material extruder 39 for the sealing portion before the switching timing of the movable core portion 51, the time lag can be substantially eliminated, and the switching timing of the movable core portion 51 and the change timing of the material supply amount in the annular molding space 42 can be closely synchronized with each other.

Figure 9:
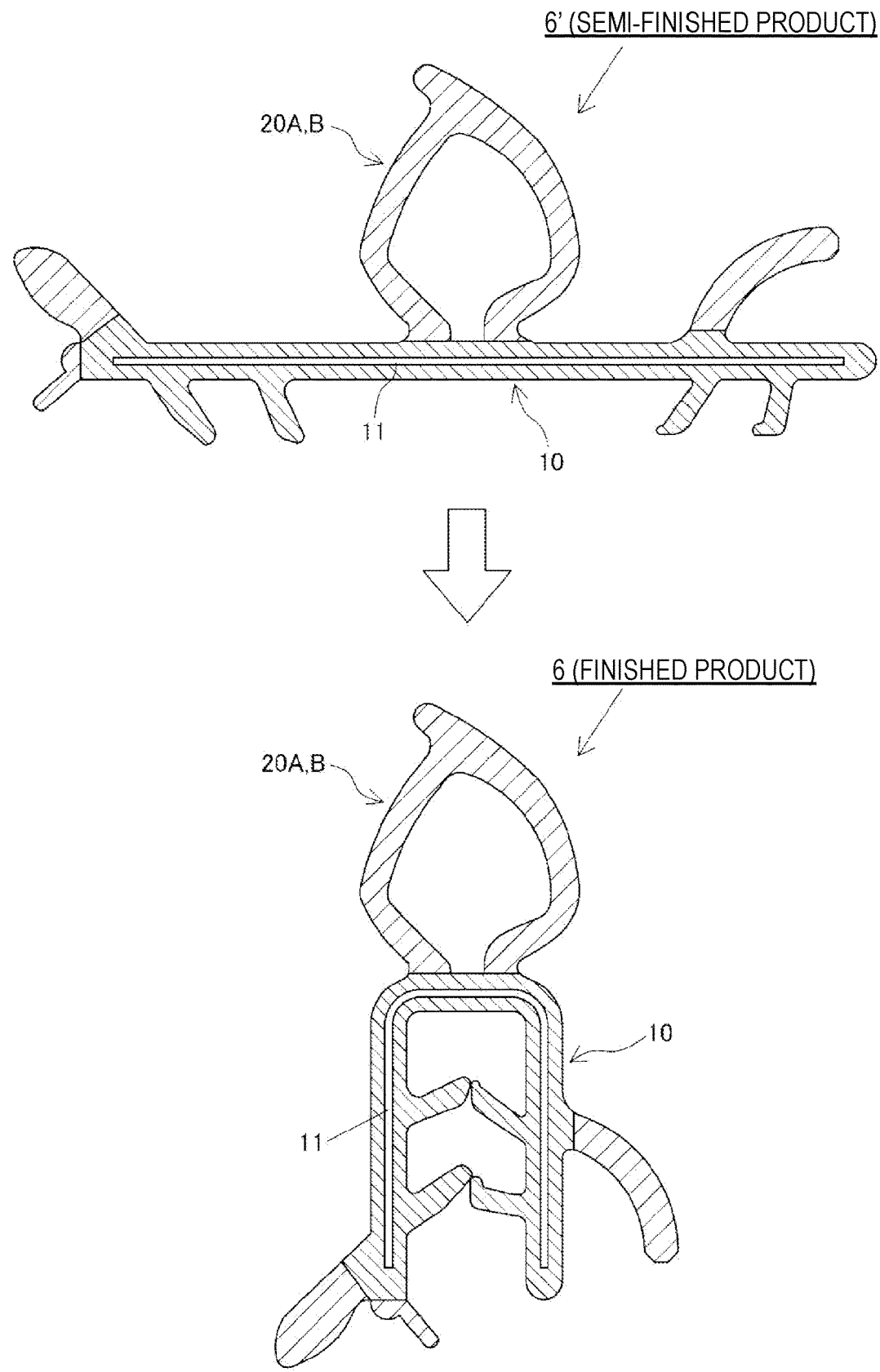
FIG. 9 is a schematic front view illustrating a semi-finished product and a finished product of a weather strip.

As illustrated in the upper half portion of FIG. 9, the weather strip semi-finished product 6' that is immediately discharged from the head 32 is in a state where the core metal 11 extends linearly in the horizontal direction. In addition, in the semi-finished product 6', the sealing portions 20A and 20B having a hollow tunnel shape are connected to each other in the longitudinal direction. However, in this step, the foaming agent in the rubber material has not foamed, and thus there is no significant difference between the height h1 of the sealing portion 20A and the height h2 of the sealing portion 20B.

The weather strip semi-finished product 6' discharged from the head 32 is transported to the heating tank 33, and is heated at a predetermined temperature (for example, 180° C. to 220° C.) for a predetermined time (for example, one to nine minutes) while passing through the heating tank 33. Due to this heating, the vulcanizing agent included in the rubber material is activated such that the vulcanization (polymer crosslinking reaction) of the rubber is performed, and the foaming agent included in the rubber material foams such that the expansion and sponging of the sealing portions 20A and 20B and the auxiliary lips 14a to 14c of the attachment portion 10 are realized. Along with the foaming of the foaming agent, the entire area of the sealing portions 20A and 20B expand. However, due to a difference in the amount of the foaming agent corresponding to the wall thickness between the sealing portion 20A and the sealing portion 20B, the external shape of the sealing portion 20B is clearly larger than the external shape of the sealing portion 20A. That is, the height h2 of the sealing portion 20B is larger than the height h1 of the sealing portion 20A (after foaming, h1<h2).

The weather strip semi-finished product 6' having undergone vulcanization and foaming in the heating tank 33 is cooled in the cooling machine 34. Next, the attachment portion 10 of the weather strip semi-finished product 6' is bent in a U-shape in the core metal bending machine 35. As a result, the weather strip 6 (finished product) having a final cross-sectional shape as illustrated in the lower half portion of FIG. 9 is obtained. The weather strip 6 having passed through the core metal bending machine 35 is taken up by the hauling machine 36, and is packaged for shipping after quality inspection.

According to the embodiment, in the step (FIG. 8) of disposing the movable core portion 51 at the retreat position and extruding the corner corresponding portion 6B of the weather strip, as compared to the step (FIG. 7) of disposing the movable core portion 51 at the advance position and extruding the lateral side corresponding portion 6A, the cross-sectional area, at the die outlet position, of the annular molding space 42 for the sealing portion increases, and the supply amount per unit time of the rubber material for the sealing portion to the molding space 42 is increased. Therefore, the supply amount per unit area of the rubber material for the sealing portion can be made to be constant (uniform) at any position in the annular molding space 42. As a result, in the obtained weather strip 6, corrugation of a part of the sealing portion 20B of the corner corresponding portion 6B can be avoided.

According to the embodiment, the core 50 that forms the annular molding space 42 in cooperation with the facing surface 47 for molding of the die 40 includes the movable core portion 51 and the fixed core portion 52. The fixed core portion 52 functions as a support member for supporting the movable core portion 51 such that the movable core portion 51 is stably movable along the extrusion direction. In addition, the fixed core portion 52 also functions as a partition member (or a partition plate) for partitioning the main supply path 43 in the die 40, the main supply path 43 being a path for supplying the rubber material to the molding space 41 for the attachment portion. Due to the presence of the fixed core portion 52, the rubber material for the sealing portions 20A and 20B and the rubber material for the attachment portion 10 are prevented from being mixed with each other randomly in the die 40, and the weather strip 6 in which the two kinds of rubber materials are distributed orderly can be manufactured.

[Modification of First Embodiment]

In the first embodiment, the lower side corresponding portion 6C of the weather strip 6 has substantially the same cross-sectional shape and dimension as the lateral side corresponding portion 6A, and has a uniform cross-sectional shape in the longitudinal direction. However, a portion of the lower side corresponding portion 6C other than a center portion may have the same cross-sectional shape and dimension as the lateral side corresponding portion 6A (first portion), and as illustrated in FIG. 10, the center portion of the lower side corresponding portion 6C may be configured as "third portion of the weather strip" having a cross-sectional shape and a dimension that are different from those of the lateral side corresponding portion 6A (first portion) and are also different from those of the corner corresponding portion 6B (second portion).

Figure 10:
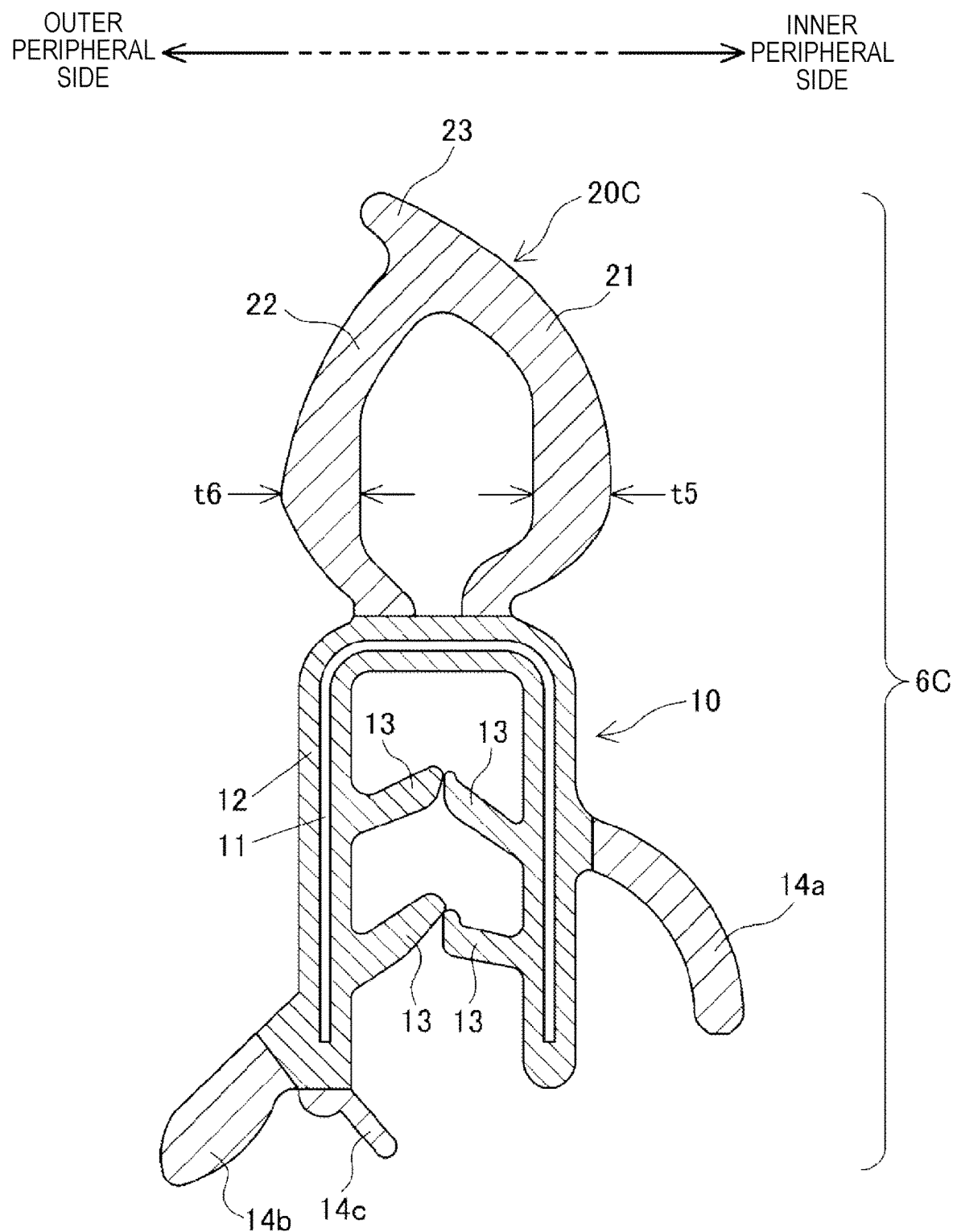
FIG. 10 illustrates a modification of the first embodiment and is a cross-sectional view of the weather strip taken along line X-X.

FIG. 10 illustrates a cross-section taken along line X-X of (A) of FIG. 1, that is, a cross-section of the center portion of the lower side corresponding portion 6C of the weather strip 6 that is attached to the lower side portion 4c of the back door opening portion 3. The center portion of the lower side corresponding portion 6C illustrated in the diagram also includes the attachment portion 10 and a sealing portion 20C having a hollow tunnel shape. The attachment portion 10 of the center portion of the lower side corresponding portion 6C has substantially the same shape and dimension as the attachment portion 10 of the lateral side corresponding portion 6A.

As in the sealing portion 20A of the lateral side corresponding portion 6A, the sealing portion 20C of the center portion of the lower side corresponding portion 6C includes the inner peripheral side wall portion 21 and the outer peripheral side wall portion 22. However, unlike the sealing portion 20A, the sealing portion 20C is surrounded by the wall portions 21 and 22 such that a tunnel-shaped hollow region having a substantially hexagonal shape in cross-section is secured in the sealing portion 20A. In the vicinity of a height position corresponding to the height of the boundary line L between the base side portion and the top side portion in the sealing portion 20A, a wall thickness t5 of the inner peripheral side wall portion 21 and a wall thickness t6 of the outer peripheral side wall portion 22 are the largest. Relationships between the wall thicknesses t5 and t6 and the respective wall thicknesses of the sealing portions 20A and 20B are as follows.

t1H<t3H<t5 and t1R=t3R<t5
t2H<t4H<t6 and t2R=t4R<t6

Regarding the elongated weather strip 6 according to the modification including the lateral side corresponding portion 6A and the portion of the lower side corresponding portion 6C other than the center portion as the first portion, the corner corresponding portion 6B as the second portion, and the center portion of the lower side corresponding portion 6C as the third portion, the weather strip 6 can be extruded by using a movable core portion 51' obtained by slightly modifying the movable core portion 51 used in the first embodiment. Specifically, as illustrated in (A) and (B) of FIG. 11, the movable core portion 51' includes a pair of outer surfaces 51c that substantially vertically stands at the left and right sides of the most distal end portion thereof, the first outer peripheral surface 51a, which is the same as that in the first embodiment, in an intermediate portion adjacent to the most distal end portion thereof, and the second outer peripheral surface 51b, which is the same as that in the first embodiment, in a rear portion rear to the intermediate portion. In the most distal end portion of the movable core portion 51', an upper surface 51d (refer to (B) of FIG. 11) that connects an upper end of the left outer surface 51c and an upper end of the right outer surface 51c is connected to the first outer peripheral surface 51a and has substantially the same shape as the first outer peripheral surface 51a.

In a case where the movable core portion 51' illustrated in (A) and (B) of FIG. 11 is used, by disposing the movable core portion 51' at the first position where the second outer peripheral surface 51b is disposed to face the facing surface 47 for molding of the die outlet, the lateral side corresponding portion 6A and the portion of the lower side corresponding portion 6C other than the center portion as the first portion can be extruded. In addition, by disposing the movable core portion 51' at the second position where the first outer peripheral surface 51a is disposed to face the facing surface 47 for molding of the die outlet, the corner corresponding portion 6B as the second portion can be extruded. Further, by disposing the movable core portion 51' at a third position at which the two outer surfaces 51c and the upper surface 51d are disposed to face the facing surface 47 for molding of the die outlet, the center portion of the lower side corresponding portion 6C as the third portion can be extruded.

It is preferable that the weather strip 6 in which the sealing portion 20C of the center portion of the lower side corresponding portion 6C is the thickest portion is adopted as a weather strip for the back door opening portion 3 as in the modification. The reason for this will be described. In the back door opening portion 3, not only a locking mechanism of the back door 2 but also a device that detects the half-shut state of the back door 2 are provided in the vicinity of the center portion of the lower side portion 4c in many cases. In this case, in a case where the repulsive force of the sealing portion of the weather strip that is disposed around the device for detecting the half-shut state of the back is weak, although the back door 2 is completely shut, the detecting device may erroneously determine that "the door body is half-shut" such that a door half-shut warning lamp is erroneously turned on. In order to prevent the door half-shut warning lamp from being erroneously turned on, it is preferable that the rebound resilience of the sealing portion of the weather strip disposed around the device detecting the half-shut state of the back door is high to some extent. Thus, the configuration in which the wall thickness of the sealing portion 20C corresponding to the center portion of the lower side portion 4c is set to be relatively large such that the repulsive force of the sealing portion 20C increases has an advantageous effect in that the door half-shut warning lamp can be prevented from being erroneously turned on.

Figure 12:
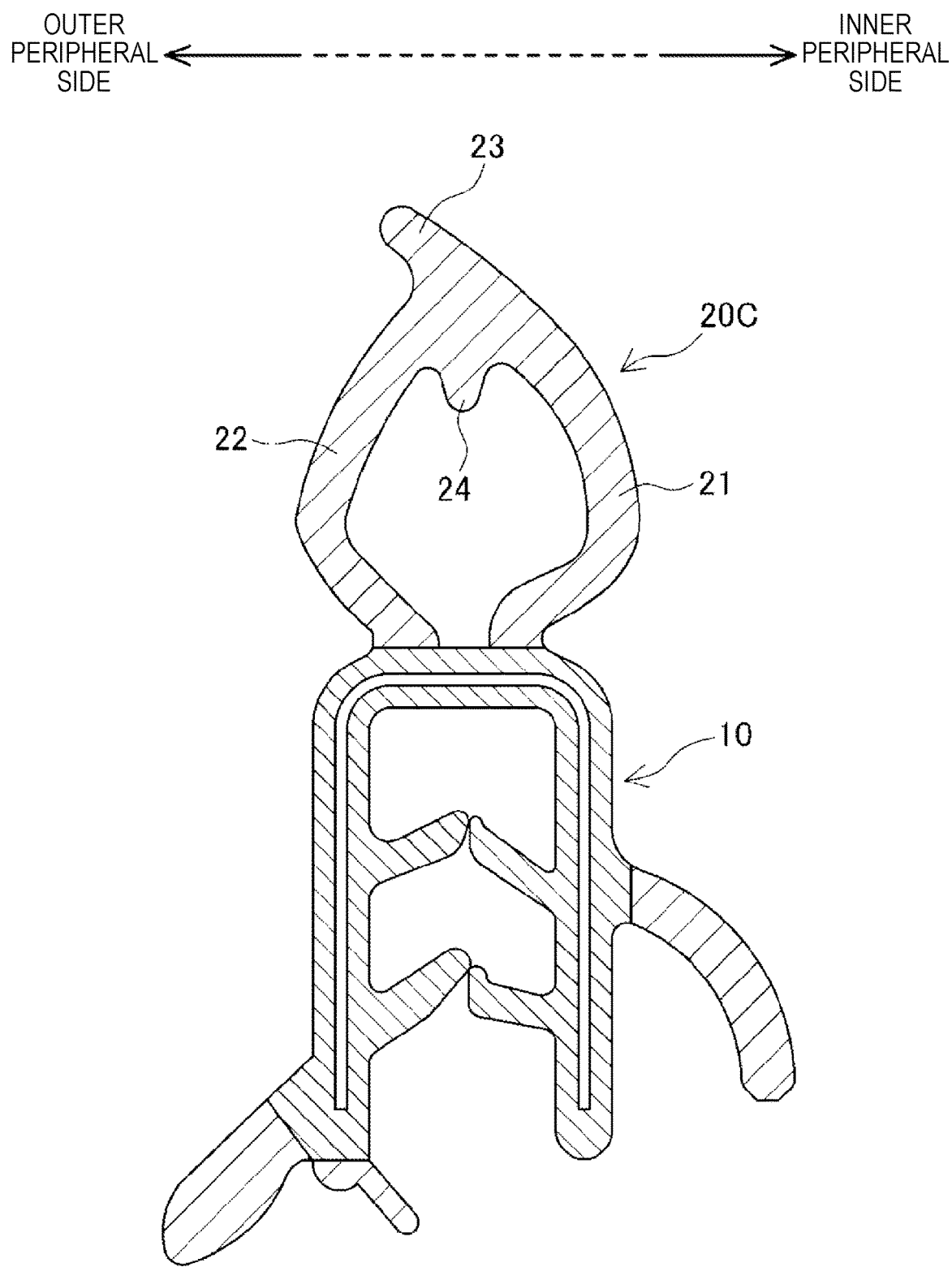
FIG. 12 is a cross-sectional view of a weather strip according to another modification of the first embodiment.

In addition, a rubber stopper may be provided at a predetermined position in a door of a vehicle. In a peripheral portion of a door or a door opening portion, a sealing portion of a weather strip that is mounted around a portion coming into contact with the stopper may be formed in the shape of the sealing portion 20C illustrated in FIG. 10. The reason for this will be described. In a case where the door is repeatedly opened and closed, the stopper may crack or may be damaged, and in order to prevent damages to the stopper, it is preferable that the rebound resilience of the sealing portion of the weather strip that is mounted around the portion coming into contact with the stopper is increased to relieve an impact applied to the stopper during the closing of the door. Accordingly, by setting the wall thickness to be relatively thick as in the sealing portion 20C of FIG. 10 in order to increase the repulsive force of the sealing portion, damages to the stopper can be prevented. The shape for improving the rebound resilience of the sealing portion is not limited to the shape of the sealing portion 20C of FIG. 10, and may be, for example, a shape in which a semicircular thick portion 24 is formed on an inner surface side in the vicinity of a top portion of the sealing portion 20C as illustrated in FIG. 12 (that is, in the vicinity of the upper end portion 23).

Second Embodiment

FIGS. 13 to 18 illustrate a second embodiment of the invention. Hereinafter, different points from the first embodiment will be mainly described. (A) of FIG. 13 is a diagram corresponding to (A) of FIG. 1 of the first embodiment, and (B) of FIG. 13 is the same diagram as (B) of FIG. 1. As illustrated in (A) of FIG. 13, the weather strip 6 according to the second embodiment includes at least a lateral side corresponding portion 6E, a lower side corresponding portion 6F as the first portion, and an upper side corresponding portion 6G as the second portion.

Figure 14:
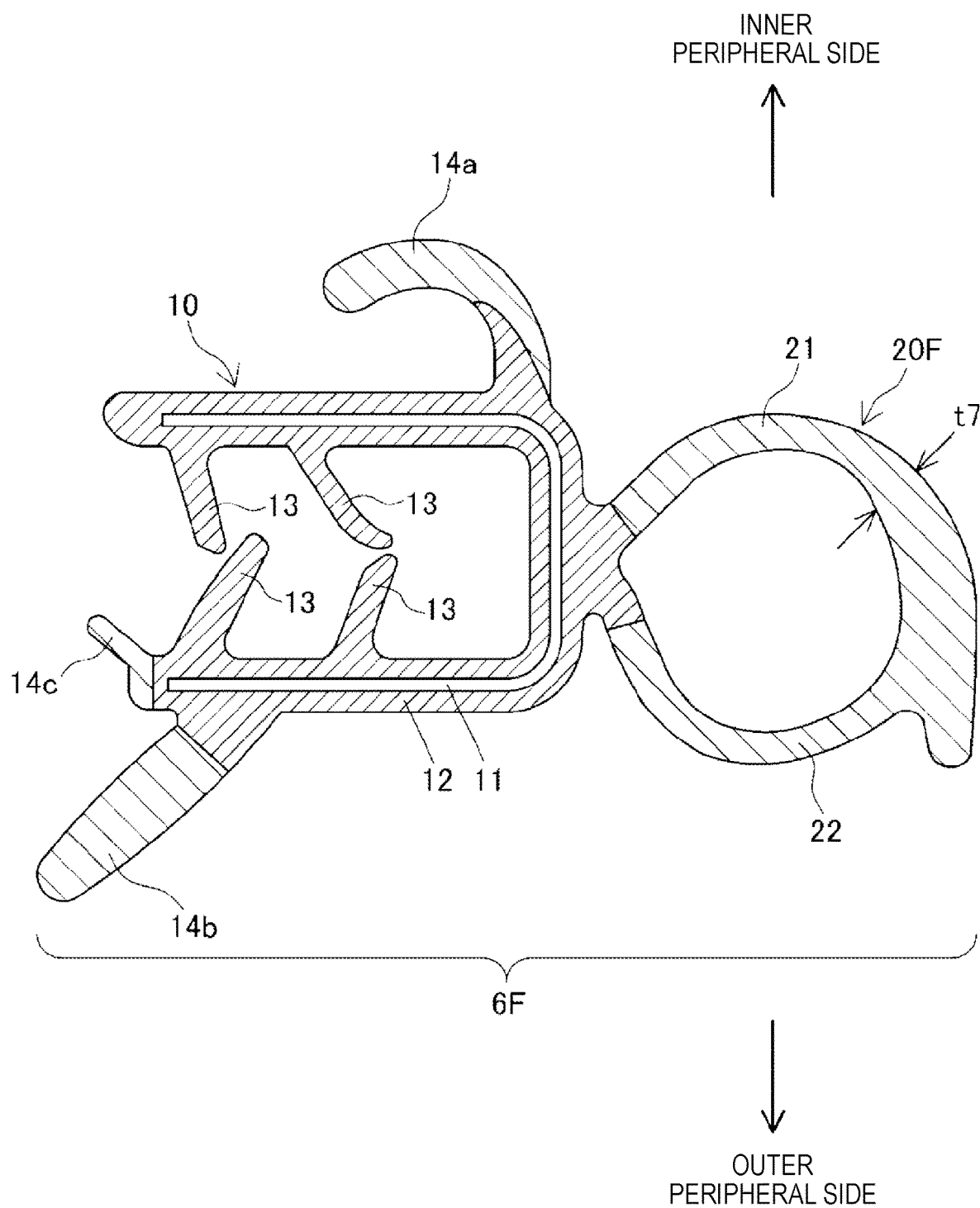
FIG. 14 is a cross-sectional view of the weather strip taken along line P-P of FIG. 13A.
Figure 15:
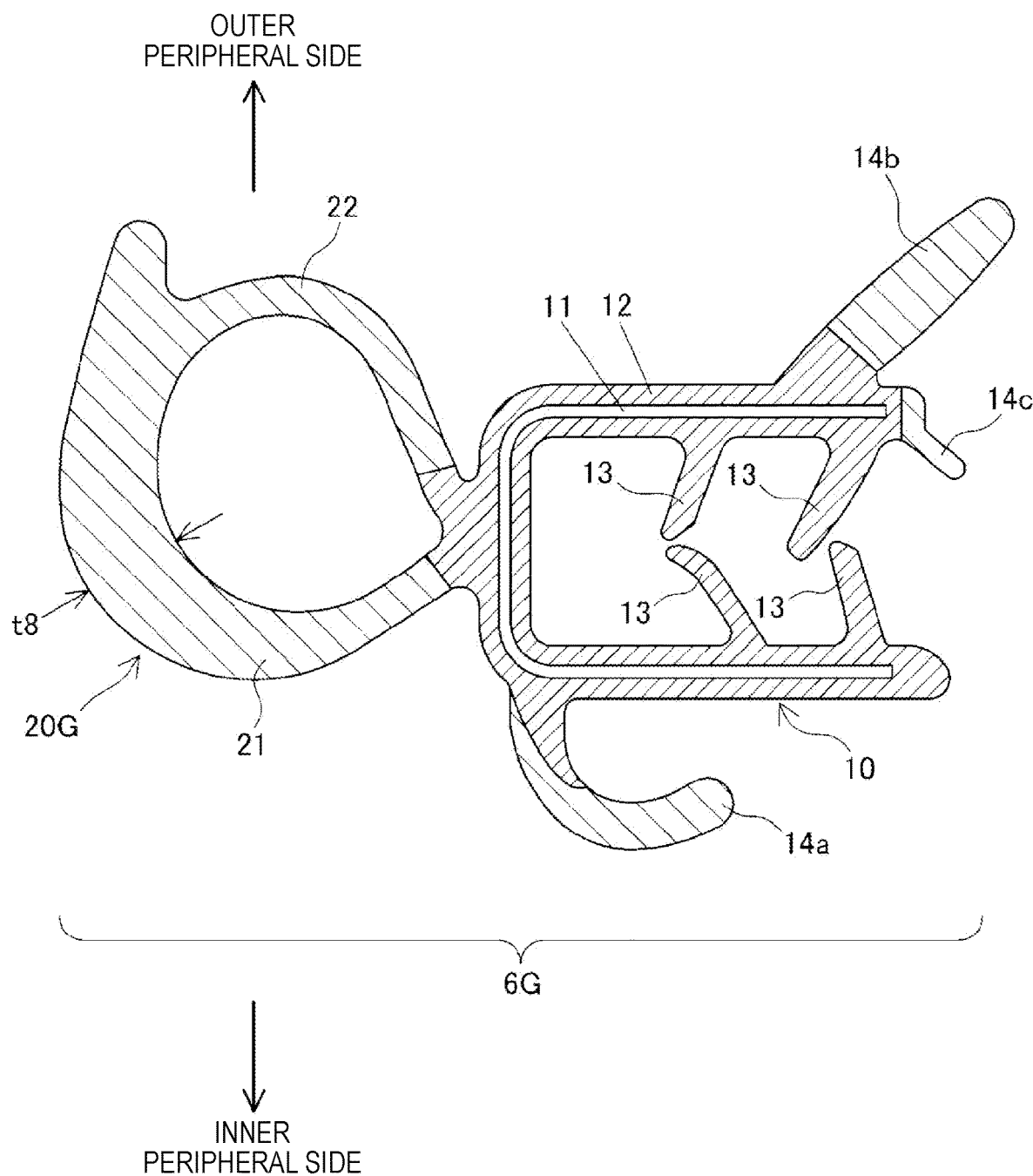
FIG. 15 is a cross-sectional view of the weather strip taken along line Q-Q of FIG. 13A.

FIG. 14 illustrates a cross-section taken along line P-P of (A) of FIG. 13, that is, a cross-section of the lower side corresponding portion 6F of the weather strip 6 that is attached to the lower side portion 4c of the back door opening portion 3. In addition, FIG. 15 illustrates a cross-section taken along line Q-Q of (A) of FIG. 13, that is, a cross-section of the upper side corresponding portion 6G of the weather strip 6 that is attached to the upper side portion 4a of the back door opening portion 3. As illustrated in the drawings, the lower side corresponding portion 6F (or the upper side corresponding portion 6G) includes: the attachment portion 10; and a sealing portion 20F (or a sealing portion 20G) having a hollow tunnel shape that is disposed adjacent to and integrated with the attachment portion 10.

The attachment portion 10 of the lower side corresponding portion 6F and the attachment portion 10 of the upper side corresponding portion 6G have substantially the same shape and dimension, and includes the core metal 11, the rubber cover portion 12, the four holding lips 13, and the three auxiliary lips (the interior lip 14a, the exterior lip 14b, and the distal lip 14c) as in the attachment portion 10 according to the first embodiment (refer to FIGS. 2 and 3).

Each of the sealing portion 20F of the lower side corresponding portion 6F and the sealing portion 20G of the upper side corresponding portion 6G includes the inner peripheral side wall portion 21 and the outer peripheral side wall portion 22. The sealing portions 20F and 20G are common in that each of the sealing portions 20F and 20G is surrounded by the wall portions 21 and 22 such that a tunnel-shaped hollow region having a substantially circular shape in cross-section is secured. The sealing portion 20G is generally thicker than the sealing portion 20F, and at wall thickness measurement points corresponding to the sealing portions 20G and 20F, a wall thickness t8 of the sealing portion 20G is larger than a wall thickness t7 of the sealing portion 20F (t7<t8).

In the weather strip 6 according to the second embodiment, the lateral side corresponding portion 6E that is attached to the lateral side portion 4b of the back door opening portion 3 has substantially the same cross-sectional shape and dimension as the lower side corresponding portion 6F (first portion).

Figure 16:
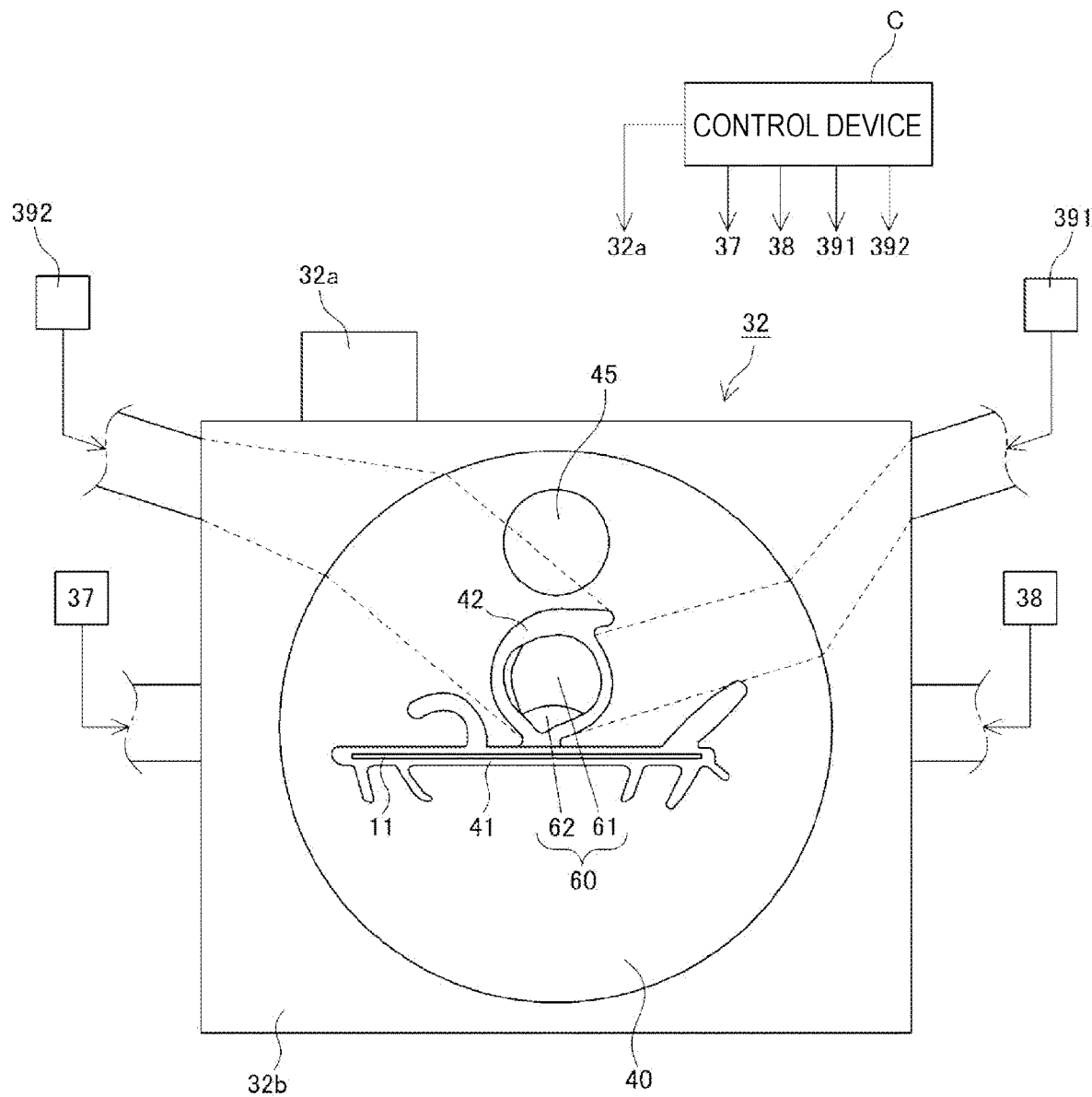
FIG. 16 is a front view illustrating a head for extrusion according to a second embodiment when seen from the front side (the downstream side of the manufacturing line).
Figure 17:
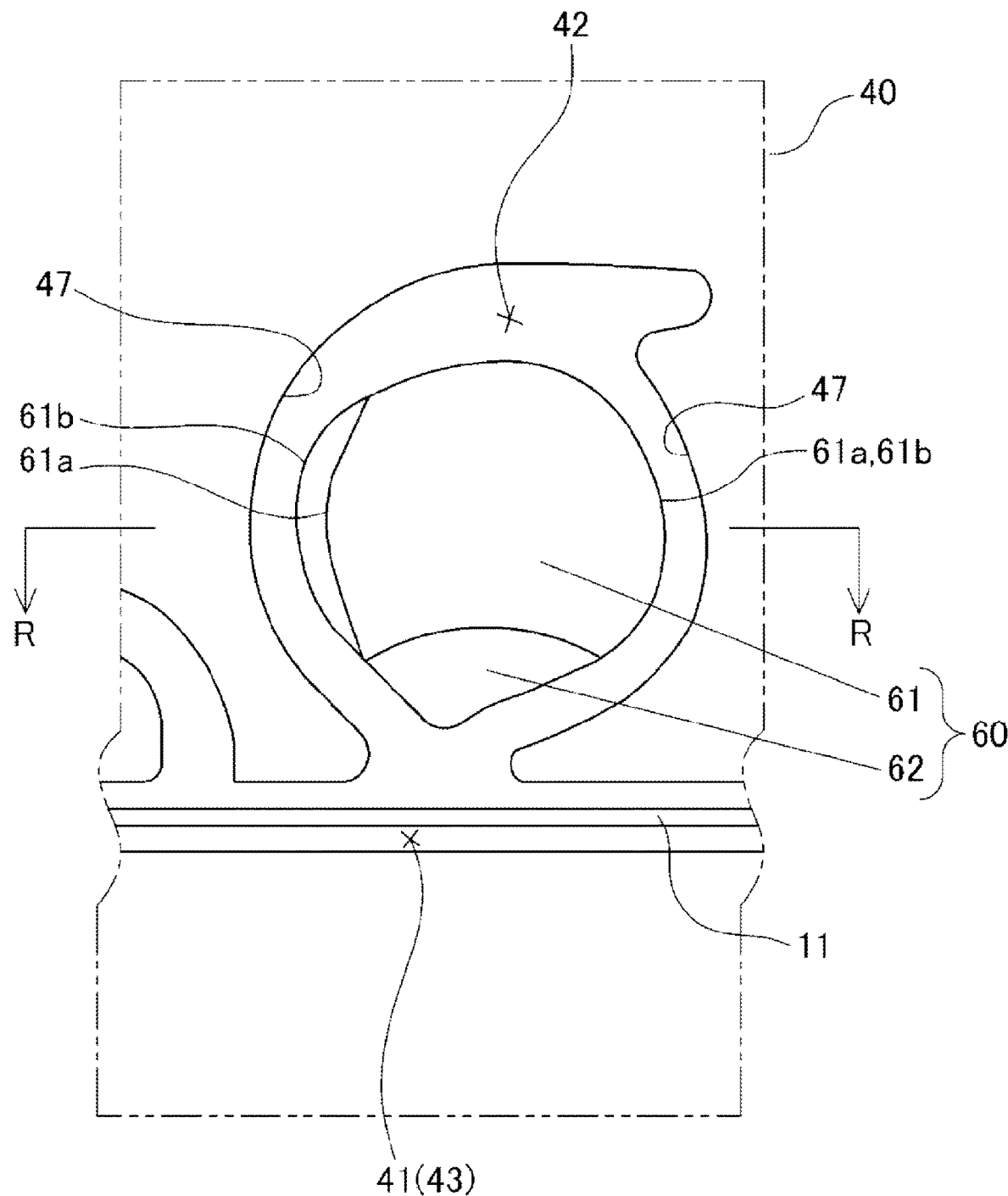
FIG. 17 is an enlarged front view illustrating an annular molding space for a sealing portion according to the second embodiment and the vicinity thereof.

The weather strip 6 according to the second embodiment illustrated in (A) of FIGS. 13 to 15 can be extruded using an extrusion facility illustrated in FIGS. 16 to 18. The extrusion facility according to the second embodiment has the same basic configuration as the extrusion facility (FIGS. 4 to 8) according to the first embodiment. However, the extrusion facility according to the second embodiment is different from the extrusion facility according to the first embodiment in the structure of the core (in particular, the movable core portion) and the number and arrangement state of material extruders. Hereinafter, different points from the first embodiment will be mainly described.

As illustrated in FIGS. 16 to 18, the core 60 according to the second embodiment includes a movable core portion 61 and a fixed core portion 62. The fixed core portion 62 according to the second embodiment has a front shape that is slightly different from that of the fixed core portion 52 according to the first embodiment, but has substantially the same basic function or role as the fixed core portion 52 according to the first embodiment.

As in the case of the first embodiment, the movable core portion 61 according to the second embodiment is constituted by a part (lower portion) of the movable body 45 and extends along the extrusion direction. The movable core portion 61 is configured such that a distal end portion (downstream side portion in the extrusion direction) and a distal end trailing portion that is provided rear to (upstream of) the distal end portion have different cross-sections. Specifically, as illustrated in FIGS. 17 and 18, an outer peripheral surface 61a of the distal end portion of the movable core portion 61 and an outer peripheral surface 61b of the distal end trailing portion of the movable core portion 61 are formed such that outlines thereof match with each other on the upper side and the right side in a front view of the movable core portion 61. On the other hand, on the left side in the front view of the movable core portion 61, the outer peripheral surfaces 61a and 61b are formed with a step such that the outer peripheral surface 61a of the distal end portion retreats further to the center of the movable core portion 61 than the outer peripheral surface 61b of the distal end trailing portion. As a result, the outer peripheral surface 61a of the distal end portion of the movable core portion 61 corresponds to a small cross-sectional area portion of the movable core portion 61 having a relatively small cross-sectional area, and the outer peripheral surface 61b of the distal end trailing portion corresponds to a large cross-sectional area portion of the movable core portion 61 having a larger cross-sectional area than the small cross-sectional area portion.

Accordingly, as illustrated in (A) of FIG. 18, in a case where the movable core portion 61(and the movable body 45) is disposed at the advance position (first position) and the outer peripheral surface 61b of the distal end trailing portion of the movable core portion 61 is disposed to face the facing surface 47 for molding of the die outlet, all the widths of the upper side, the right side, and the left side of the annular molding space 42 for the sealing portion are relatively small. On the other hand, as illustrated in (B) of FIG. 18, in a case where the movable core portion 61(and the movable body 45) is disposed at the retreat position (second position) and the outer peripheral surface 61a of the distal end portion of the movable core portion 61 is disposed to face the facing surface 47 for molding of the die outlet, the widths of the upper side and the right side of the annular molding space 42 for the sealing portion are substantially the same as those in the case of (A) of FIG. 18, whereas the width of the left side of the molding space 42 is larger than that in the case of (A) of FIG. 18.

In a case where this point is expressed in another way, the cross-sectional shape at the die outlet position of the movable core portion 61 (or the entire core 60) disposed at the retreat position (second position) corresponds to a shape obtained by cutting a left side portion in the left-right direction (width direction) from the cross-sectional shape at the die outlet position of the movable core portion 61 (or the entire core 60) disposed at the advance position (first position) (refer to FIG. 17). This way, the movable core portion 61 (and the entire core 60) is configured to have different cross-sectional shapes at at least two positions along the extrusion direction (positions having different cross-sectional shapes).

As illustrated in FIG. 16, the extrusion facility according to the second embodiment includes four material extruders 37, 38, 391, and 392. As in the case of the first embodiment, the first material extruder 37 supplies a rubber material for the rubber cover portion 12 and the holding lip 13, which is an EPDM rubber material including a vulcanizing agent, to the head 32, and the second material extruder 38 supplies a rubber material for the auxiliary lips 14a to 14c, which is an EPDM rubber material including a vulcanizing agent and a foaming agent, to the head 32. On the other hand, the third and fourth material extruders 391 and 392 according to the second embodiment correspond to two material extruders into which the function of the third material extruder 39 according to the first embodiment (the material extruder for supplying a rubber material for the sealing portion, which is an EPDM rubber material including a vulcanizing agent and a foaming agent, to the head 32) is distributed. That is, the third material extruder 391 is a material extruder for the sealing portion outer peripheral side, which is for supplying the rubber material for the sealing portion to a portion of the annular molding space 42 for the sealing portion which is for forming the outer peripheral side wall portion 22 (right side substantially semi-circular portion of the annular molding space 42 illustrated in FIG. 16). On the other hand, the fourth material extruder 392 is a material extruder for the sealing portion inner peripheral side, which is for supplying the rubber material for the sealing portion to a portion of the annular molding space 42 for the sealing portion which is for forming the inner peripheral side wall portion 21 (left side substantially semi-circular portion of the annular molding space 42 illustrated in FIG. 16). The four material extruders 37, 38, 391, and 392 and the head 32 (in particular, the driving mechanism 32a of the movable body) are electrically connected to a control device C and are controlled by the control device C.

As in the case of the first embodiment, in the extrusion process according to the second embodiment, a weather strip semi-finished product is extruded while appropriately switching the disposition of the movable core portion 61 as a part of the movable body 45 between the advance position (first position) and the retreat position (second position). Specifically, when the sealing portion 20F of the lower side corresponding portion 6F as the first portion of the weather strip is extruded, the movable core portion 61 is disposed at the advance position (refer to (A) of FIG. 18) as the first position, and the outer peripheral surface 61b of the distal end trailing portion of the movable core portion 61 is disposed to face the facing surface 47 for molding of the die 40. On the other hand, when the sealing portion 20G of the upper side corresponding portion 6G as the second portion of the weather strip is extruded, the movable core portion 61 is disposed at the retreat position (refer to (B) of FIG. 18) as the second position, and the outer peripheral surface 61a of the distal end portion of the movable core portion 61 is disposed to face the facing surface 47 for molding of the die 40. At this time, as can be seen from (B) of FIG. 18, at the die outlet position, the left side (inner peripheral side) of the molding space 42 for the sealing portion is wider than the right side (outer peripheral side) thereof.

In the extrusion process, the control device C changes the screw rotation speed of the fourth material extruder 392 (material extruder for the sealing portion inner peripheral side) according to a back-and-forth movement schedule of the movable core portion 61 so as to adjust the supply amount of the rubber material to the left side (inner peripheral side) of the annular molding space 42. Specifically, in a case where the extrusion process is in an extrusion step (refer to (A) of FIG. 18) of the first portion 6F (that is, the sealing portion 20F), the screw rotation speed of the fourth material extruder 392 is reduced to relatively reduce the supply amount per unit time of the rubber material for the sealing portion. On the other hand, in a case where the extrusion process is in an extrusion step (refer to (B) of FIG. 18) of the second portion 6G (that is, the sealing portion 20G), the screw rotation speed of the fourth material extruder 392 is increased (acceleration) to relatively increase the supply amount per unit time of the rubber material for the sealing portion. In this way, even in a case where there is a difference in width between the right side (outer peripheral side) and the left side (inner peripheral side) of the annular molding space 42 for the sealing portion according to the back-and-forth movement of the movable core portion 61, by performing the control of the supply amount of the rubber material using the above-described control method on the left side substantially semi-circular portion (portion for forming the inner peripheral side wall portion 21) of the molding space 42 for the sealing portion, the supply amount of the rubber material for the sealing portion per unit area can be made to be constant (uniform) at any position in the annular molding space 42. As a result, in the obtained weather strip, corrugation of a part of the sealing portion 20G of the upper side corresponding portion 6G can be avoided, and the entire surface of the sealing portion 20G can be made to be smooth.

REFERENCE SIGNS LIST

2: Back door (door body)
3: Back door opening portion (vehicle body opening portion)
4a: Upper side portion (peripheral portion)
4b: Lateral side portion (peripheral portion)
4c: Lower side portion (peripheral portion)
5a: Upper corner portion (peripheral portion)
5c: Lower corner portion (peripheral portion)
6: Weather strip
6A: Lateral side corresponding portion (first portion of weather strip)
6B: Corner corresponding portion (second portion of weather strip)
6C: Lower side corresponding portion
6D: Upper side corresponding portion
6E: Lateral side corresponding portion
6F: Lower side corresponding portion (first portion of weather strip)
6G: Upper side corresponding portion (second portion of weather strip)
10: Attachment portion
20A, 20B, 20C: Hollow sealing portion
20F, 20G: Hollow sealing portion
21: Inner peripheral side wall portion
22: Outer peripheral side wall portion
32: Head (extrusion die)
40: Die
41: Lower half portion of molding space (molding space for attachment portion)
42: Upper half portion of molding space (annular molding space for sealing portion)
50: Core
51: Movable core portion
51a: First outer peripheral surface (corresponding to small cross-sectional area portion of movable core portion 51)
51b: Second outer peripheral surface (corresponding to large cross-sectional area portion of movable core portion 51)
52: Fixed core portion
60: Core
61: Movable core portion
61a: Outer peripheral surface of distal end portion
61b: Outer peripheral surface of distal end trailing portion
62: Fixed core portion

The invention claimed is:

1. A method for manufacturing an elongated weather strip for sealing a gap between a vehicle body opening portion and a door body according to an extrusion method using an extrusion die, the vehicle body opening portion being bordered with a peripheral portion, and the door body being capable of closing the vehicle body opening portion, the elongated weather strip including at least a first portion and a second portion in a longitudinal direction and a hollow sealing portion capable of coming into contact with the door body or the peripheral portion of the vehicle body opening portion, at least a part of a wall thickness of the hollow sealing portion being configured such that a wall thickness of the hollow sealing portion in the second portion is larger than a wall thickness of the hollow sealing portion in the first portion, the extrusion die including a die for molding at least an external shape of the hollow sealing portion and a core for molding an inner shape of the hollow sealing portion, the core including a movable core portion that is movable relative to the die along an extrusion direction, the movable core portion being capable of being disposed at at least two positions including a first position that is a position for molding the first portion of the weather strip and a second position that is a position for molding the second portion of the weather strip, the core being formed such that, regarding a cross-sectional shape of the core at an outlet position of the die, a cross-sectional shape of the core when the movable core portion is disposed at the first position is non-similar to a cross-sectional shape of the core when the movable core portion is disposed at the second position, and the core being formed such that, regarding a cross-sectional area, at the die outlet position, of a molding space for the hollow sealing portion which is secured between the core and the die, a cross-sectional area of the molding space when the movable core portion is disposed at the second position is larger than a cross-sectional area of the molding space when the movable core portion is disposed at the first position, the method comprising:
A) a step of molding the first portion of the weather strip in a state where the movable core portion is disposed at the first position; and
B) a step of molding the second portion of the weather strip in a state where the movable core portion is disposed at the second position, wherein, in the step B), a supply amount per unit time of a material for the sealing portion to the molding space that is secured between the core and the die is larger than the supply amount in the step A).

2. The method for manufacturing a weather strip according to claim 1, wherein:

the elongated weather strip further includes an attachment portion adjacent to the hollow sealing portion in a cross-section thereof, the core includes the movable core portion and a fixed core portion that supports the movable core portion such that the movable core portion is movable along the extrusion direction, and the fixed core portion extends along the extrusion direction in a state where the fixed core portion is integrated with the die and is disposed at a boundary between the molding space for the hollow sealing portion which is secured between the core and the die and a molding space for the attachment portion which is secured in the die.

3. The method for manufacturing a weather strip according to claim 1, wherein the movable core portion has different cross-sectional shapes at at least two positions along the extrusion direction such that a cross-sectional shape, at the die outlet position, of the movable core portion disposed at the first position is non-similar to a cross-sectional shape, at the die outlet position, of the movable core portion disposed at the second position and such that a cross-sectional area, at the die outlet position, of the movable core portion disposed at the first position is larger than a cross-sectional area, at the die outlet position, of the movable core portion disposed at the second position.

4. The method for manufacturing a weather strip according to claim 3, wherein the cross-sectional shape, at the die outlet position, of the movable core portion disposed at the second position corresponds to a shape obtained by partially cutting the cross-sectional shape, at the die outlet position, of the movable core portion disposed at the first position.

5. An elongated weather strip for sealing a gap between a vehicle body opening portion and a door body, the vehicle body opening portion being bordered with a peripheral portion, and the door body being capable of closing the vehicle body opening portion, the elongated weather strip comprising:

at least a first portion and a second portion in a longitudinal direction, a hollow sealing portion capable of coming into contact with the door body or the peripheral portion of the vehicle body opening portion, and an attachment portion adjacent to the hollow sealing portion, wherein:

in a cross-section of the hollow sealing portion, the hollow sealing portion is capable of being divided into a base side portion where the hollow sealing portion is adjacent to the attachment portion and a top side portion that is a remaining portion of the hollow sealing portion other than the base side portion, a wall thickness of the base side portion in the first portion is substantially equal to a wall thickness of the base side portion in the second portion, and a wall thickness of the top side portion in the second portion is larger than a wall thickness of the top side portion in the first portion, and an external shape of the hollow sealing portion in the cross-section is configured such that an external shape in the second portion is larger than an external shape in the first portion.

* * * * *